United States Patent [19]

Wada et al.

[11] Patent Number: 4,888,387

[45] Date of Patent: Dec. 19, 1989

[54] RESIN COMPOSITION COMPRISING A POLYAMIDE OR POLYCARBONATE

[75] Inventors: Akihiro Wada, Inagi; Rin-ichi Kakuta, Tokyo; Kenji Ohuchi, Yokohama; Jun Sugiyama, Yokohama; Shinji Hasegawa, Yokohama, all of Japan

[73] Assignee: Asahi Kasei Kogyo Kabushiki Kaisha, Osaka, Japan

[21] Appl. No.: 320,634

[22] Filed: Mar. 8, 1989

[30] Foreign Application Priority Data

Mar. 10, 1988 [JP] Japan .................................. 63-055038
Mar. 24, 1988 [JP] Japan .................................. 63-070455

[51] Int. Cl.$^4$ ........................ C08L 77/00; C08L 69/00
[52] U.S. Cl. ............................................ 525/66; 525/67
[58] Field of Search ...................... 525/66, 67, 64, 133, 525/148, 179

[56] References Cited

U.S. PATENT DOCUMENTS

| 4,217,424 | 8/1980 | Weese et al. ........................... 525/67 |
| 4,254,232 | 3/1981 | Mueller ................................. 525/66 |

FOREIGN PATENT DOCUMENTS

| 0094215 | 3/1987 | European Pat. Off. . |
| 003971 | 1/1964 | Japan . |
| 40-7380 | 4/1965 | Japan . |
| 55-80459 | 6/1980 | Japan . |
| 56-50931 | 5/1981 | Japan . |
| 3815225 | 3/1986 | Japan . |
| 61-89255 | 5/1986 | Japan . |
| 62-32140 | 2/1987 | Japan . |
| 62-25700 | 6/1987 | Japan . |
| 63-22229 | 5/1988 | Japan . |
| 2060649A | 5/1981 | United Kingdom . |

Primary Examiner—Theodore E. Pertilla
Attorney, Agent, or Firm—Armstrong, Nikaido, Marmelstein, Kubovcik & Murray

[57] ABSTRACT

A resin composition comprising (A) a copolymer comprising hexagonal units selected from hexagonal acid anhydride units, hexagonal imide units and mixtures thereof, methyl methacrylate units, (meth)acrylic acid units and optionally aromatic vinyl compound units, (B) a graft copolymer rubber, and (C) at least one polymer selected from a polyamide and a polycarbonate, wherein the weight proportions of components (A), (B) and (C) relative to the total weight of components (A), (B) and (C) are in the ranges of from 5 to 50%, from 5 to 50% and from 45 to 80%, respectively. The resin composition has surprisingly improved impact strength not possessed by any of the individual component polymers of the resin composition, while maintaining advantageous properties, such as moldability, other mechanical strengths, rigidity, heat resistance, moisture resistance, chemical resistance and dimensional stability, attributed to the individual component polymers. Advantageous applications of the resin composition of the present invention are found in the manufacturing of various parts for automobiles, household electrical appliances and business machines.

15 Claims, 2 Drawing Sheets

RESIN COMPOSITION COMPRISING A POLYAMIDE OR POLYCARBONATE

BACKGROUND OF THE INVENTION

1. Field Of The Invention

The present invention relates to a resin composition. More particularly, the present invention is concerned with a resin composition comprising, in specific proportions, a copolymer comprising hexagonal units, methyl methacrylate units, (meth)acrylic acid units and optionally aromatic vinyl compound units, a graft copolymer rubber and at least one polymer selected from a polyamide and a polycarbonate. The resin composition has surprisingly improved impact strength not possessed by any of the individual component polymers of the resin composition, while maintaining advantageous properties, such as moldability, mechanical strengths, rigidity, heat resistance, moisture resistance, chemical resistance and dimensional stability, attributed to the individual component polymers. Advantageous applications of the resin composition of the present invention are found in the manufacturing of various parts for automobiles, household electrical appliances and business machines.

2. Discussion of Related Art

Polyamide resins are now widely used as parts for automobiles, household electrical appliances and business machines. Generally, polyamide resins have excellent chemical resistance, heat resistance and wear resistance. However, the shrinkage thereof at the time of molding is large so that a molded article is likely to have disadvantageous sink marks and warp. Moreover, polyamide resins exhibit high water absorption, and are likely to suffer from a marked lowering in mechanical strength and change in dimension, which are attributed to water absorption.

Various proposals have been made in order to cope with the drawbacks of the known polyamide resins. For example, it was proposed to use a resin composition comprising a polyamide and, blended therewith, a polystyrene, a styrene-acrylonitrile copolymer, etc. (see Japanese Patent Application Publication Specification No. 40-7380/1965). The polymers employed for blending have low compatibility with the polyamide so that a layer peeling (a phenomenon in which a surface portion is peeled in the form of a skin layer) is likely to occur in a molded article. The low compatibility further causes the molded article to suffer from a marked lowering in mechanical strength. Therefore, the above-mentioned resin composition has inherent drawbacks and is not satisfactory for use in the manufacturing of parts to be incorporated in automobiles, household electrical appliances and business machines.

Further, it was proposed to use a resin composition comprising a copolymer composed of styrene units and units of a five-membered ring acid anhydride, such as maleic anhydride, which copolymer has molecular chains chemically bonded to those of a polyamide [see British Patent No. 2,060,649 (corresponding to Japanese Patent Application Laid-Open Specification No. 56-50931/1981)]. The resin composition has drawbacks in that it has poor rigidity, Izod impact strength, falling weight impact strength, scuff resistance and wear resistance.

Still further, it was proposed to use a resin composition comprising a polyamide and, blended therewith, a copolymer comprising hexagonal acid anhydride units of the formula:

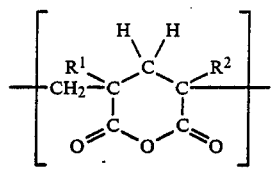

wherein each of $R^1$ and $R^2$ is independently a hydrogen atom or a methyl group, methyl methacrylate units, aromatic vinyl compound units and (meth)acrylic acid units (see Japanese Patent Application Laid-Open Specification No. 61-89255/1986). The resin composition has a drawback in that its Izod impact strength is as poor as 3.3 to 4.3 kg.cm/cm (⅛ inch in thickness, notched).

Still further, it was proposed to use a resin composition comprising a polyamide and, blended therewith, a polyglutarimide [see European Patent No. 94,215 (corresponding to Japanese Patent Application Laid-Open Specification No. 58-208348/1983 and Japanese Patent Application Publication Specification No. 63-22229/1988)]. The Izod impact strength of the resin composition is as poor as 7.5 to 8 kg.cm/cm (⅛ inch in thickness, notched).

As described above, various resin compositions comprising a polyamide as a base component have been proposed, but all of the compositions have problems with respect to the properties required for the parts of automobiles, household electrical appliances and business machines.

Also, polycarbonate resins are now widely used as parts for automobiles, household electrical appliances and business machines. Generally, polycarbonate resins have excellent heat resistance, mechanical strength, chemical resistance and transparency. However, the resins have drawbacks in that the Izod impact strength thereof is dependent highly on the thickness of the molded product, and in that the moldability of the resins is poor.

Various proposals have been made in order to cope with the drawbacks of the polycarbonate resins. For example, it was proposed to use a resin composition comprising a polycarbonate and, blended therewith, a terpolymer of acrylonitrile, butadiene and styrene (generally known as "ABS resin"). In this connection, reference is made to Japanese Patent Application Publication Specification No. 38-15225/1963. Further, it was proposed in Japanese Patent Application Publication Specification No. 39-71/1964 to use a resin composition comprising a polycarbonate and a terpolymer of methyl methacrylate, butadiene and styrene (generally known as "MBS resin"). Still further, it was proposed in U.S. Pat. No. 4,254,232 (corresponding to Japanese Patent Application Laid-Open Specification No. 55-80459/1980) to use a resin composition comprising a polycarbonate, a polyglutarimide and an MBS resin. Of these resin compositions, the compositions comprising a polycarbonate and a resin selected from an ABS resin and an MBS resin have a drawback in that simultaneous improvement of moldability and heat resistance or rigidity is difficult. On the other hand, the resin composition comprising a polycarbonate, a polyglutarimide and an MBS resin does not have satisfactory impact strength.

As described above, various resin compositions comprising a polycarbonate as a base component have been proposed, but all of the compositions have problems with respect to the properties required for the parts of automobiles, household electrical appliances and business machines.

In Japanese Patent Application Publication Specification No. 62-25700/1987, it was proposed to use a resin composition comprising a copolymer composed of hexagonal acid anhydride units, methyl methacrylate units, aromatic vinyl compound units and (meth)acrylic acid units and a graft copolymer rubber. The resin composition has excellent moldability, tensile strength, rigidity, transparency and heat resistance. However, the resin composition has a drawback in that the impact strength thereof is poor.

As apparent from the foregoing, a number of resin compositions have been proposed for use in the manufacturing of various parts to be used in automobiles, household electrical appliances and business machines. However, all of the known resin compositions have drawbacks with respect to the properties required for such parts. Therefore, there has been a strong demand in the art for a resin composition which is excellent in all of the properties, i.e., moldability, mechanical strength, rigidity, heat resistance, moisture resistance, chemical resistance, dimensional stability and impact strength.

SUMMARY OF THE INVENTION

The inventors of the present invention noted the excellent properties, such as moldability, tensile strength, rigidity and heat resistance, of the resin composition comprising a copolymer comprising hexagonal acid anhydride and/or hexagonal imide units, methyl methacrylate units, aromatic vinyl compound units and (meth)acrylic acid units and a graft copolymer rubber (Japanese Patent Application Publication Specification No. 62-25700/1987), and made extensive and intensive studies to improve the impact strength of the composition. As a result, it has unexpectedly been found that a resin composition comprising a copolymer comprising hexagonal units, methyl methacrylate units, (meth)acrylic acid units and optionally aromatic vinyl compound units (hereinafter often simply referred to as "MSMAA copolymer") and a graft copolymer rubber has excellent compatibility with a polyamide and a polycarbonate. This is quite surprising because a polyamide is incompatible with a graft copolymer rubber, whereas a polycarbonate is incompatible with an MSMAA copolymer and a graft copolymer rubber. Further, it has unexpectedly been found that when at least one polymer selected from the group consisting of a polyamide and a polycarbonate is blended with a resin composition comprising an MSMAA copolymer and a graft copolymer rubber in an amount of 45% or more, based on the total weight of the resultant composition, the resultant composition exhibits a surprising improvement in impact strength as demonstrated in FIGS. 1 and 2. That is, a resin composition comprising an MSMAA copolymer, a graft copolymer rubber and 45% or more of at least one polymer selected from a polyamide and a polycarbonate has been found to have surprisingly improved impact strength while maintaining advantageous properties attributable to the component polymers. Based on these findings, the present invention has been completed.

It is, therefore, an object of the present invention to provide a novel resin composition which is excellent in moldability, mechanical strength, rigidity, heat resistance, moisture resistance, chemical resistance and dimensional stability, and has remarkably improved impact strength as compared to similar conventional resin compositions.

The foregoing and other objects, features and advantages of the present invention will be apparent to those skilled in the art from the following detailed description and appended claims taken in connection with the accompanying drawings.

DETAILED DESCRIPTION OF THE PRESENT INVENTION

Figure 1:
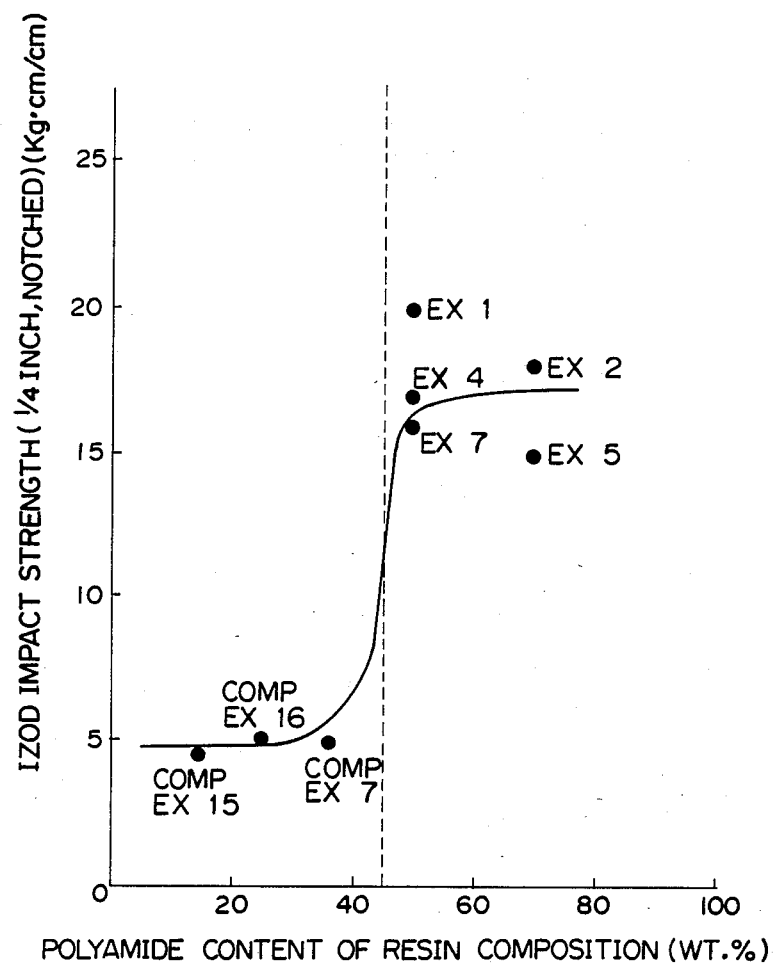
FIG. 1 is a graph showing the effect on Izod impact strength of the polyamide content of a resin composition comprising an MSMAA copolymer, a graft copolymer rubber and a polyamide, in which graph the "EX" means Example and the "COMP EX" means Comparative Example; an FIG. 2 is a graph showing the effect on Izod impact strength of the polycarbonate content of a resin composition comprising an MSMAA copolymer, a graft copolymer rubber and a polycarbonate, in which graph the "EX" means Example and the "COMP EX" means Comparative Example.

According to the present invention, there is provided a resin composition comprising:

(A) a copolymer comprising
(a) 5 to 74.5% by weight of hexagonal units selected from the group consisting of hexagonal acid anhydride units of the formula:

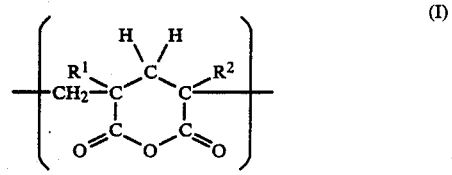

wherein each of R1 and R2 independently represents a hydrogen atom or a methyl group,
hexagonal imide units of the formula:

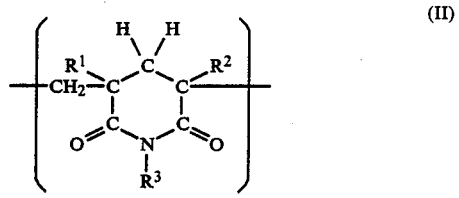

wherein $R^1$ and $R^2$ are as defined above, and $R^3$ is a member selected from the group consisting of a hydrogen atom, an alkyl group, a cycloalkyl group and an aryl group, and mixtures thereof;
(b) 20 to 89.5% by weight of methyl methacrylate units;
(c) 0 to 69.5% by weight of aromatic vinyl compound units; and
(d) 0.5 to 20% by weight of methacrylic acid units or acrylic acid units, with the proviso that the sum of components (a), (b), (c) and (d) is 100% by weight, (B) a graft copolymer rubber comprising an elastomer having a glass transition temperature of up to −30° C. and a graft component grafted thereto, said graft component comprising aromatic vinyl compound units and methacrylic ester units, the weight proportion of said graft component relative to said elastomer being at least 20%, and (C) at least one polymer selected from the group consisting of a polyamide and a polycarbonate, the weight proportion of the copolymer (A) relative to the total weight of components (A), (B) and (C) being 5 to 50%, the weight proportion of the graft copolymer rubber (B) relative to the total weight of components (A), (B) and (C) being 5 to 50%, and the weight proportion of the polymer (C) relative to the total weight of components (A), (B) and (C) being 45 to 80%.

Hereafter, the present invention will be described in detail.

In the resin composition of the present invention, as component (A), there is employed a copolymer comprising:

(a) 5 to 74.5% by weight of hexagonal units selected from the group consisting of hexagonal acid anhydride units of the formula:

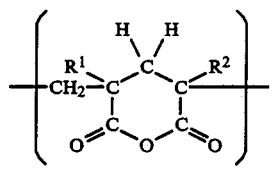

(I)

wherein each of $R^1$ and $R^2$ independently represents a hydrogen atom or a methyl group, hexagonal imide units of the formula:

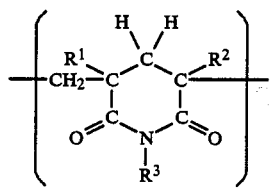

(II)

wherein $R^1$ and $R^2$ are as defined above, and $R^3$ is a member selected from the group consisting of a hydrogen atom, an alkyl group, a cycloalkyl group and an aryl group,
and mixtures thereof;

(b) 20 to 89.5% by weight of methyl methacrylate units;

(c) 0 to 69.5% by weight of aromatic vinyl compound units; and (d) 0.5 to 20% by weight of methacrylic acid units or acrylic acid units,
with the proviso that the sum of components (a), (b), (c) and (d) is 100% by weight.

The method for preparing the above-mentioned copolymer is not critical. For example, the copolymer containing, as component (a), hexagonal acid anhydride units of formula (I) as defined above (hereinafter often simply referred to as "the hexagonal acid anhydride copolymer") may be prepared by a customary method in which a mixture consisting of methyl methacrylate and methacrylic acid or acrylic acid, optionally consisting of methyl methacrylate, an aromatic vinyl compound and methacrylic acid or acrylic acid, is subjected to copolymerization reaction and the resultant copolymer is further subjected to ring formation reaction in which intramolecular condensation occurs between neighboring methacrylic acid or acrylic acid units and between a methacrylic or acrylic acid unit and a neighboring methyl methacrylate unit. As a result of the ring formation reaction, the hexagonal acid anhydride units of formula (I) are formed.

More specifically, the hexagonal acid anhydride copolymer containing aromatic vinyl cmpound units may be prepared by a process comprising the steps of:

(i) subjecting a monomer mixture composed of 15 to 95 parts by weight of methyl methacrylate, 0 to 90 parts by weight of an aromatic vinyl compound and 2 to 95 parts by weight of methacrylic or acrylic acid to continuous bulk polymerization or continuous solution polymerization, the continuous solution polymerization being effected by adding up to 100 parts by weight, per 100 parts by weight of the monomer mixture, of a solvent to the monomer mixture, thereby to obtain a reaction mixture containing a preliminary copolymer, and (ii) heating the reaction mixture at 200° to 300° C. for 10 to 90 minutes under a pressure of 100 Torr or less, thereby to form, in the molecules of the preliminary copolymer, hexagonal acid anhydride units of formula (I) defined above.

As the aromatic vinyl compound, there may be mentioned, for example, styrene, α-methylstyrene, p-methylstyrene, 2,4-dimethylstyrene, p-tert-butylstyrene, p-chlorostyrene and combinations thereof. Among the above compounds, styrene, α-methylstyrene and a combination thereof are preferred.

The polymerization of the monomer mixture may be performed either by continuous bulk polymerization or continuous solution polymerization. However, from a viewpoint of ease in the control of the rate of polymerization and the viscosity of the polymerization system, solution polymerization is preferred in most cases. In the case where α-methylstyrene is used as the aromatic vinyl compound, bulk polymerization is preferably employed, since the polymerization rate an the viscosity of the system can be maintained stably within appropriate ranges without any solvent.

When the polymerization is effected by continuous solution polymerization, a solvent is employed in an amount up to 100 parts by weight per 100 parts by weight of the monomer mixture. In most cases, the amount of the solvent is preferably 5 to 100 parts by weight based on the monomer mixture. However, when α-methylstyrene is used as the aromatic vinyl compound, a solvent is employed generally in an amount less than 20 parts by weight based on the monomer mixture.

Examples of solvents include aromatic hydrocarbons such as benzene, toluene, xylene and ethylbenzene; ketones such as acetone, methyl ethyl ketone, methyl isobutyl ketone and cycolhexanone; esters such as methyl isobutyrate; ethers such as ethylene glycol monoethyl ether and tetrahydrofuran; and alcohols such as methyl, ethyl, isopropyl, butyl and cyclohexyl alcohols.

As a polymerization initiator for the monomer mixture, organic peroxides and azo-compounds may be used. Of these, preferred are those whose half-life periods at 60° to 150° C. are about 10 hours. For example, there can be mentioned lauroyl peroxide, benzoyl peroxide, 1,1-bis(t-butylperoxy)3,3,5-trimethylcyclohexane, 1,1-bis(t-butylperoxy)cyclohexane, t-butyl peroxyisopropylcarbonate, t-butyl peroxybenzoate, di-t-butyl peroxide, 2,2'-azobis isobutyronitrile, 1,1'-azobis cyclohexane-1-carbonitrile and 2-cyano-2-propylazoformamide.

As a chain transfer agent for controlling the molecular weight of the preliminary copolymer, there may preferably be employed for example, thiols such as octanethiol and hydrocarbons such as an α-methylstyrene dimer.

A heat stabilizer may be added to the monomer mixture in order that the preliminary copolymer obtained in step (i) is stable when treated in subsequent step (ii) which is conducted at a high temperature of 200° to 300° C. Preferred heat stabilizers include phosphorous ester compounds such as 1,1,3-tris(2-methyl-4-ditridecylphosphite-5-t-butylphenyl)butane, dinonylphenylpentaerythritol diphosphite, tris(2,4-di-t-butylphenyl)phosphite and tris(nonylphenyl)phosphite, and hindered phenol compounds such as 2,6-di-tert-butyl-4-methyl phenol, 4,4-butylidene-bis-(6-tert-butyl-3-methyl phenol), n-octadecyl-β-(4-hydroxy-3,5-di-t-butylphenyl)propionate and 1,1,3-tris(2-methyl-4-hydroxy-5-t-butylphenyl)butane.

As the polymerization reaction vessel, a vessel of either a perfect-mixing type or a plug flow type may be employed. As the perfect-mixing type, a vessel type equipped with a stirrer, a tubular high-speed circulation type and the like may be employed.

In step (i), the monomer mixture is continuously supplied to a polymerization vessel, together with a solvent and with the above-mentioned various agents according to need, and polymerized generally at 50° to 180° C. by a conventional polymerization method, thereby to obtain a reaction mixture containing a preliminary copolymer.

In step (ii), the reaction mixture obtained in step (i) is heated at 200° to 300° C., preferably 240° to 280° C., for 10 to 90 minutes, preferably 30 to 90 minutes, under a pressure of 100 Torr or less, thereby to form, in the molecules of the preliminary copolymer, hexagonal acid anhydride units of formula (I) defined above.

The heating of the reaction mixture containing the preliminary copolymer, any monomers remaining unreacted and the solvent if used is generally effected in a volatilizing vessel. Preferably, before being supplied to the volatilizing vessel, the reaction mixture obtained in step (i) is heated to 200° to 300° C. by the use of a preheater. In step (ii), in the heat treatment of the reaction mixture for the formation of the hexagonal acid anhydride units, the solvent if used and any monomers remaining unreacted are removed by volatilization from the reaction mixture.

In the preparation of the hexagonal acid anhydride copolymer, it is preferred that reaction conditions, such as reaction temperature and amounts of a polymerization initiator and a molecular weight modifier be regulated so that the final copolymer has a reduced viscosity ($\eta sp/c$) in the range of from 0.15 to 2 dl/g as measured at 25° C. with respect to a 0.3 w/v solution of the copolymer in chloroform. If the reduced viscosity of the hexagonal acid anhydride copolymer is less than 0.15 dl/g, the mechanical strength of the ultimate resin composition is likely to be poor, whereas if the reduced viscosity exceeds 2 dl/g, the molding properties of the ultimate resin composition are likely to be poor.

The hexagonal acid anhydride copolymer may readily be imidized to thereby obtain the copolymer containing, as component (a), hexagonal imide units of formula (II) as defined hereinbefore (hereinafter often simply referred to as "the hexagonal imide copolymer").

In formula (II), it is preferred that $R^3$ be selected from the group consisting of a hydrogen atom, an alkyl group having 1 to 10 carbon atoms, a cycloalkyl group having 5 to 12 carbon atoms and an aryl group having 7 to 22 carbon atoms. It is most preferred that $R^3$ be a hydrogen atom or a phenyl group.

The imidization for converting the hexagonal acid anhydride copolymer to the hexagonal imide copolymer can be performed by customary methods. For example, the imidization can be performed by a process comprising the steps of:

(iii) adding to the reaction product obtained in step (ii) mentioned hereinbefore 0.04 to 5 equivalents, relative to the hexagonal acid anhydride units of formula (I), of ammonia or a primary amine, followed by kneading at 150° to 300° C. under a pressure of 2 to 100 Kg/cm$^2$, (iv) maintaining the resulting mixture obtained in step (iii) at a temperature and a pressure in the same ranges as those for the kneading in step (iii), the kneading and maintaining in steps (iii) and (iv) being effected totally for a period of 1 to 30 minutes, and (v) heating the mixture obtained in step (iv) at 200° to 300° C. for 0.1 to 60 minutes under a pressure of 100 Torr or less, thereby converting part or all of the hexagonal acid anhydride units formed in step (ii) to hexagonal imide units of formula (II) defined above.

In step (iii), ammonia or a primary amine is added to the reaction product obtained in step (ii), and then they are effectively kneaded.

Generally, the reaction product of step (ii) containing hexagonal acid anhydride units, is supplied in a molten state through a pipe to a kneader by means of a gear pump or a screw pump. Ammonia or a primary amine is supplied to the kneader generally through another pipe. The amount of the ammonia or primary amine to be added to the reaction product of step (ii) is 0.04 to 5 equivalents, preferably 0.4 to 2 equivalents, relative to the hexagonal anhydride units.

The hexagonal imide units contained in the final copolymer, are formed from the hexagonal acid anhydride units contained in the preliminary copolymer after step (ii). In other words, the hexagonal anhydride units formed in the preliminary copolymer after step (ii) are converted to the hexagonal imide units. This conversion is performed by the reaction of the acid anhydride units with ammonia or a primary amine. Hence, the proportion of the hexagonal acid anhydride units converted to imide units can be controlled by changing the amount of ammonia or a primary amine to be employed in step (iii). In practice, the amount of ammonia or primary amine to be added is decided after determining the amount of the hexagonal anhydride units in the reaction product obtained in step (ii). The amount of the hexagonal anhydride units may be determined by infrared spectrophotometry, and if greater precision is desired, the determination may preferably be conducted by $^{13}$C-NMR. If the amount of ammonia or a primary amine added in step (iii) is less than 0.04 equivalent relative to the hexagonal anhydride units, the proportion of the hexagonal imide units represented by formula (III) in the final copolymer becomes less than 2% by weight based on the copolymer. Such a copolymer is deficient in heat distortion resistance. On the other hand, if the amount of ammonia or a primary amine is more than 5 equivalents relative to the hexagonal anhydride units, the final copolymer becomes undesirably yellowish.

The temperature in the kneader is 150° to 300° C., preferably 180° to 230° C., and the pressure is 2 to 100 Kg/cm². If the pressure is less than 2 Kg/cm², the kneading cannot be performed effectively.

The ammonia or primary amine to be used in step (iii) can be gaseous or liquid, or in the form of an aqueous solution. The primary amine can also be used in the form of a mixture with a solvent. When the ammonia or primary amine is used in the form of a solution or mixture, the concentration is not particularly limited.

The primary amine to be used in step (iii) is represented by the formula $$R^4-NH_4$$

wherein $R^4$ stands for an alkyl group having 1 to 10 carbon atoms, a cycloalkyl group having 5 to 12 carbon atoms, an aralkyl group having 7 to 22 carbon atoms or an aryl group having 6 to 12 carbon atoms. As such primary amines, there may be mentioned for example, alkyl- and cycloalkylamines such as methylamine, ethylamine, n-propylamine, isopropylamine, n-butylamine, isobutylamine, sec-butylamine, t-butylamine, n-pentylamine, isopentylamine, 1,2-dimethylpropylamine, hexylamine, cyclohexylamine and octylamine; aralkylamines such as benzylamine, D- or L-α-phenethylamine and β-phenethylamine; and aromatic-amines such as aniline, o-toluidine, 2,4,6-trichloroaniline, 4-nitro-2-toluidine, α-naphthylamine, β-naphthylamine, 2-methoxyaniline, 4-methoxyaniline, 2-ethoxyaniline and 4-ethoxyaniline. Among ammonia and the above-mentioned primary amines, preferred are ammonia, methylamine, cyclohexylamine and aniline, and most preferred are ammonia and aniline.

In step (iv), the resulting mixture obtained in step (iii) is maintained at a temperature and a pressure in the same ranges as those for the kneading in step (iii), i.e., at 150° to 300° C. and 2 to 100 Kg/cm².

The total time of the kneading in step (iii) and the treatment in step (iv) is 1 to 30 minutes.

During steps (iii) and (iv), there occurs addition reaction of ammonia or primary amine to the hexagonal anhydride units in the preliminary copolymer, thereby cleaving the hexagonal anhydride units. Therefore, if the period of the kneading in step (iii) and the treatment in step (iv) is less than one minute, the addition reaction cannot proceed sufficiently. If the period is more than 30 minutes, an undesirable deesterification reaction occurs and the molecular weight of the preliminary copolymer is undesirably lowered.

In step (v), the mixture obtained in step (iv) is heated at 200° to 300° C., preferably 220° to 280° C., for 0.1 to 60 minutes, preferably 5 to 60 minutes, under a pressure of 100 Torr or less.

Generally, the mixture obtained in step (iv) is supplied through a preheater to a volatilizing vessel, and heated therein under the above conditions, thereby converting part or all of the hexagonal anhydride units, which have been cleaved by the addition of the ammonia or primary amine, to hexagonal imide units of the formula (II) defined above. As mentioned hereinbefore, the proportion of the hexagonal anhydride units converted to hexagonal imide units can be controlled by changing the amount of ammonia or a primary amine employed in step (iii).

If the heating in step (v) is effected at a temperature lower than 200° C., the imidization reaction does not sufficiently proceed; if the temperature is higher than 300° C., the copolymer becomes undesirably yellowish. In case the pressure is higher than 100 Torr, the imidization reaction does not sufficiently proceed, and further the volatilization of the primary amine or ammonia remaining unreacted becomes insufficient, resulting in undesirable discolored products. Moreover, if the residence time, i.e., heating time, is less than 0.1 minute, the imidization does not effectively proceed; and if the residence time exceeds 60 minutes, the final copolymer becomes undesirably yellowish.

As the volatilizing vessels generally used in steps (ii) and (v), a tank type and a vent extruder type may be employed. When the residence time of 10 minutes or less is employed, the vent extruder type is preferably used; when the residence time of more than 10 minutes is employed, the tank type is preferred. Tank type volatilizing vessels include vertical and horizontal tanks with or without a stirrer, all of which are employable in the instant process. However, the preferred is a volatilizing tank in which the movement of the molten polymer is similar to plug flow so that the residence time of the molten polymer does not locally vary.

It is preferred that the thus-obtained hexagonal imide copolymer have a reduced viscosity ($\eta sp/c$) in the range of from 0.15 to 2 dl/g as measured at 25° C. with respect to a 0.3 w/v solution of the copolymer in chloroform. If the reduced viscosity of the hexagonal imide copolymer is less than 0.15 dl/g, the mechanical strength of the ultimate resin composition is likely to be poor, whereas if the reduced viscosity exceeds 2 dl/g, the molding properties of the ultimate resin composition are likely to be poor.

The copolymer as component (A) may contain both hexagonal acid anhydride units (I) and hexagonal imide units (II). It is generally preferred that the weight ratio of hexagonal acid anhydride units (I) to hexagonal imide units (II) be in the range of from 1/10 to 10/1. When the ratio is less than 1/10, it is likely that the compatibility of the copolymer (A) with a polyamide or a polycarbonate (C) will be low.

In the present invention, the hexagonal unit content of the copolymer (A) is in the range of from 5 to 74.5%. When the content exceeds 74.5%, it is likely that the ultimate resin composition will have unfavorable mechanical strength and moisture absorption. On the other hand, when the content is less than 5%, it is likely that the ultimate resin composition will have poor heat resistance and thermal stability.

The methyl methacrylate unit content of the copolymer (A) is in the range of from 20 to 89.5%. When the content exceeds 89.5%, it is likely that the ultimate resin composition will have unfavorable moisture absorption and disadvantageously low heat resistance. On the other hand, when the content is lower than 20%, the compatibility of the copolymer with a polyamide or a polycarbonate as component (C) is low.

The aromatic vinyl compound unit content of the copolymer (A) is in the range of from 0 to 69.5%, preferably from 5 to 60%. When the aromatic vinyl compound unit content exceeds 69.5%, the compatibility of the copolymer with a polyamide or a polycarbonate as component (C) is low and the ultimate resin composition exhibits poor mechanical strength. From the viewpoint of obtaining a resin composition having high moisture resistance and dimensional stability, it is preferred that the aromatic vinyl compound unit content be not smaller than 5%.

The methacrylic acid or acrylic acid unit content of the copolymer (A) is in the range of from 0.5 to 20%. When the content exceeds 20%, the ultimate resin composition is likely to have unfavorable moisture absorption and disadvantageously low thermal stability On the other hand, when the content is lower than 0.5%, the heat resistance of the ultimate resin composition is likely to be low.

In the present invention, as component (B), there is employed a graft copolymer rubber comprising an elastomer having a glass transition temperature of up to −30° C. and a graft component grafted thereto. The graft component comprises either aromatic vinyl compound units and methacrylic ester units or aromatic vinyl compound units, methacrylic ester units and acrylonitrile units. The weight proportion of the graft component relative to the elastomer is at least 20%, preferably in the range of from 20 to 120%, more preferably in the range of from 30 to 100%.

The graft copolymer rubber may be prepared by various known methods. For example, the graft copolymer rubber may be prepared by a customary method in which an elastomer is kneaded while being heated together with an aromatic vinyl compound and a methacrylic ester, or together with an aromatic vinyl compound, a methacrylic ester and acrylonitrile in the presence of a polymerization initiator as mentioned hereinbefore.

Representative examples of elastomers include a styrene-butadiene block compolymer, 1,2-polybutadiene, trans-1,4-polyisoprene, a polyethylene-butyl rubber graft copolymer and a thermoplastic acrylonitrile-butadiene rubber.

Representative examples of aromatic vinyl compounds include styrene, α-methylstyrene, p-methylstyrene, 2,4-dimethylstyrene and p-tert-butylstyrene. Of these, styrene is preferred. Representative examples of methacrylic esters include methyl methacrylate, ethyl methacrylate, propyl methacrylate, butyl methacrylate, hexyl methacrylate and 2-ethylhexyl methacrylate. Of these, methyl methacrylate is preferred.

It is generally preferred that the weight proportion of the aromatic vinyl compound relative to the methacrylic ester be in the range of from 1:9 to 9:1, and that the weight proportion of acrylonitrile relative to the sum of the aromatic vinyl compound and the methacrylic ester be in the range of from 0 to 15%. Accordingly, it is generally preferred that the weight proportions of the elastomer, the aromatic vinyl compound units, the methacrylic ester units and the acrylonitrile units relative to the weight of the graft copolymer rubber be respectively in the ranges of from 6 to 70%, from 8 to 72%, from 8 to 72% and from 0 to 14%.

From the viewpoint of attaining desired impact strength improvement, it is preferred that the weight ratio of the copolymer (A) to the graft copolymer rubber (B) be in the range of from 0.3/1 to 2/1, and that the graft copolymer rubber (B) be dispersed in the resin composition in the form of particles [just like an islands-in-sea phase structure wherein the particles are composed of components (A) and (B) and the sea phase is composed of component (C)] having a number average diameter of from 0.1 to 1.0 μm as measured in accordance with the method described later. When the diameter of the particles is larger than 1.0 μm, the ultimate resin composition is likely to have poor appearance.

The polyamide to be used in the present invention as component (C) is preferably a polyamide containing units represented by at least one member selected from the group consisting of units of the formula:

and units of the formula:

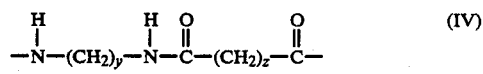

wherein each of x, y and z is independently an integer of from 1 to 10. Representative examples of such polyamides include polycaprolactam (nylon 6), polyhexamethylene adipamide (nylon 66), polyhexamethylene sebacamide (nylon 610), and nylon 66 copolymers, such as nylon -610 and nylon 66-6. Of these, polycaprolactam and polyhexamethylene adipamide are particularly preferred. The polyamides generally have a weight average molecular weight of from 40,000 to 90,000, preferably of from 50,000 to 80,000.

As a polycarbonate resin to be used as component (C) in the present invention, there may be mentioned an aromatic polycarbonate which comprises units represented by at least one member selected from the group consisting of units of the formula:

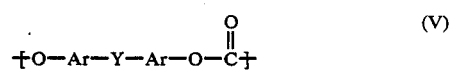

and units of the formula:

wherein Ar represents an unsubstituted phenylene group or a phenylene group substituted with a halogen atom, an alkyl group having 1 to 6 carbon atoms, a substituted alkyl group having 1 to 6 carbon atoms, an alkoxy group having 1 to 4 carbon atoms or a nitro group and Y represents an alkylene group having 1 to 12 carbon atoms, an alkylidene group having 2 to 12 carbon atoms, a cycloalkylene group having 6 to 12 carbon atoms, a cycloalkylidene group having 6 to 12 carbon atoms, an ether group, a thioether group, a sulfoxide group or a sulfonyl group.

A representative example of such polycarbonates is poly-4,4'-dioxydiphenyl-2,2'-propane carbonate. The polycarbonate to be used as component (C) in the present invention preferably has a weight average molecular weight of from 10,000 to 50,000. If the weight average molecular weight of the polycarbonate is less than 10,000, the impact strength of the ultimate resin composition is likely to be insufficient, whereas if the molecular weight exceeds 50,000, the moldability of the ultimate resin composition is likely to be low.

In the resin composition of the present invention, components (A), (B) and (C) are used in weight proportions such that the weight proportion of component (A) relative to the total weight of components (A), (B) and (C) is 5 to 50%, preferably 10 to 30%; the weight proportion of the graft copolymer rubber (B) relative to the total weight of components (A), (B) and (C) is 5 to 50%, preferably 15 to 30%; and the weight proportion of the polymer (C) relative to the total weight of components (A), (B) and (C) is 45 to 80%, preferably 45 to 70%.

If the weight proportion of the copolymer (A) relative to the total of components (A), (B) and (C) is lower than 5%, when component (C) is a polyamide, the affinity between the component (C) and component (B) is not sufficient and the ultimate shaped article is likely to suffer layer peeling, while when component (C) is a polycarbonate, the mechanical strength of the ultimate resin composition is not sufficient. On the other hand, if the weight proportion of the copolymer (A) relative to the total of components (A), (B) and (C) is more than 50%, the improvement in impact strength of the resin composition is not sufficient and, hence, the purpose of the present invention cannot be attained.

If the weight proportion of the graft copolymer rubber (B) relative to the total of components (A), (B) and (C) exceeds 50%, in the case where component (C) is a polyamide, the affinity between component (C) and component (B) becomes poor, while in the case where component (C) is a polycarbonate, the mechanical properties of the ultimate resin composition are poor.

If the weight proportion of component (C) relative to the total weight of components (A), (B) and (C) is lower than 45%, the desired impact strength improvement of the resin composition cannot be attained. On the other hand, if the weight proportion of component (C) exceeds 80%, not only the dependency on thickness of the Izod impact strength of the ultimate resin composition is increased, but also the moldability thereof is likely to be poor.

In the resin composition of the present invention, additives may be employed, which are usually used in a resin composition, such as an antioxidant, an ultraviolet absorbing agent, an inorganic filler, a lubricant, a colorant and a fire retardant. The additives can generally be incorporated into the resin composition in an amount of from 0.01 to 40% by weight, based on the weight of the composition.

The manner of blending for formulating the components (A), (B) and (C) into the resin composition of the present invention is not critical. The blending can be performed using a customary kneader under shearing force at an elevated temperature. When the component (C) is a polyamide, the temperature for performing the blending is preferably in the range of from 220° to 300° C., more preferably in the range of from 240° to 270° C. When the component (C) is a polycarbonate, the temperature for performing the blending is preferably in the range of from 240° to 330° C., more preferably in the range of from 260° to 310° C. If the blending temperature is lower than the above-mentioned ranges, it is generally difficult to attain desirable dispersion of the graft copolymer rubber (B) in the resin composition in the form of particles having a number average diameter of from 0.1 to 1.0 μm. On the other hand, if the blending temperature is higher than the above-mentioned ranges, the heat decomposition of the components is likely to occur.

Figure 2:
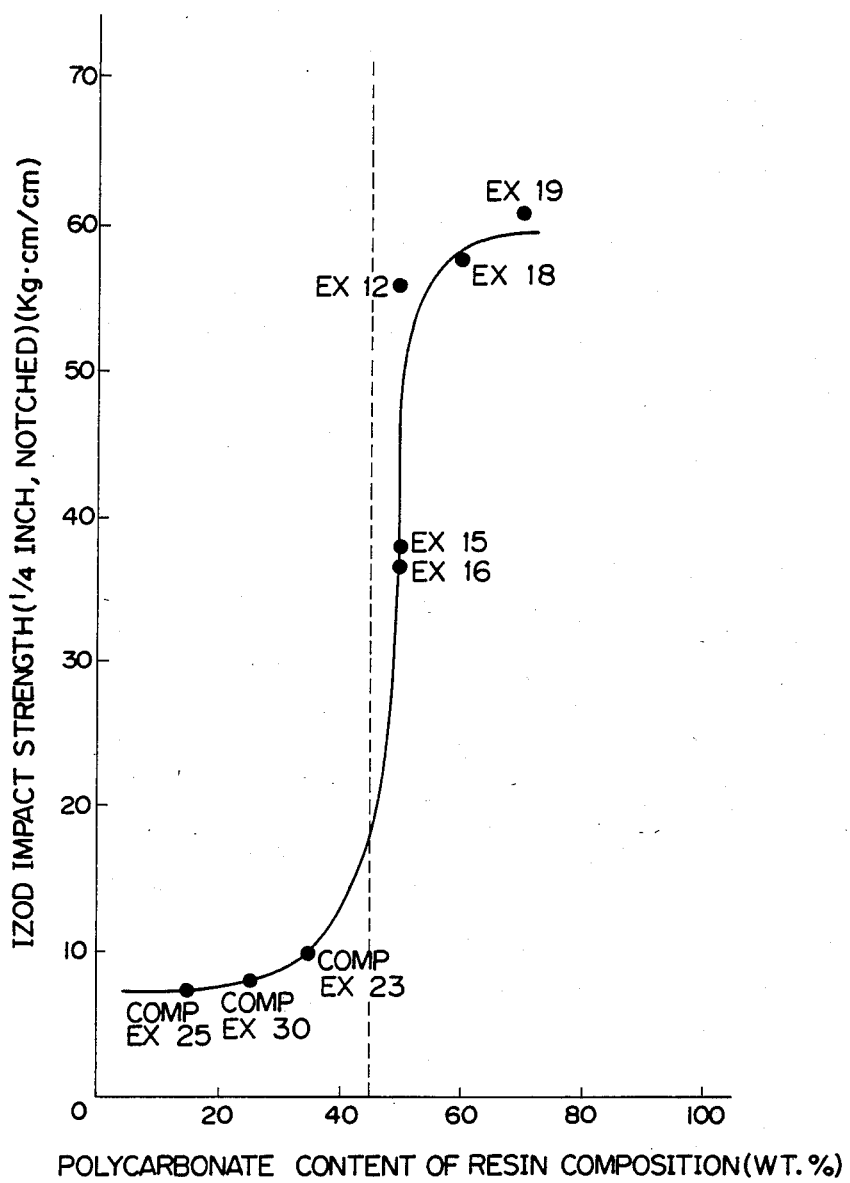

As mentioned hereinbefore, when at least one polymer (C) selected from the group consisting of a polyamide and a polycarbonate is blended with a resin composition comprising copolymer (A) and graft copolymer rubber (B) in an amount of 45% to 80%, based on the total weight of the resultant composition, the resultant composition exhibits a surprising improvement in impact strength as demonstrated in FIGS. 1 and 2, while maintaining advantageous properties attributable to the component polymers.

The resin composition of the present invention has surprisingly improved impact strength not possessed by any of the individual component polymers of the resin composition, while maintaining advantageous properties, such as moldability, other mechanical strengths, rigidity, heat resistance, moisture resistance, chemical resistance and dimensional stability, attributed to the individual component polymers. Advantageous applications of the resin composition of the present invention are found in the manufacturing of various parts for automobiles, household electrical appliances and business machines.

DETAILED DESCRIPTION OF PREFERRED EMBODIMENTS

The present invention will now be described in more detail with reference to the following Examples, Reference Examples and Comparative Examples, which should not be construed as limiting the scope of the present invention.

In the following Examples, Reference Examples and Comparative Examples, the properties were measured as follows.

(1) Izod impact strength

Izod impact strength was measured at 23° C. using a notched test piece having a thickness of ¼ inch in accordance with ASTM D-256.

(2) Falling weight impact strength

A missile-form weight having a radius of ¾ inch was caused to fall on each of 30 test pieces having a size of 150 mm×150 mm×2 mm. The falling distance (i.e., distance between the tip of the missile head and the test piece) and the weight were varied, and the workload (falling distance X weight) required to break 50% of the test pieces was determined as falling weight impact strength (kg.cm).

(3) Tensile strength at break and elongation at yield

Tensile strength at break and elongation at yield were measured in accordance with ASTM D-638.

(4) Flexural strength and flexural modulus of elasticity

Flexural strength and flexural modulus of elasticity were measured in accordance with ASTM D-790.

(5) Deflection temperature under load

Deflection temperature under load was measured in accordance with ASTM D-648.

(6) Melt flow index

Melt flow index was measured at 250° C. under a load of 10 kg in accordance with ISO-R1133.

(7) Moisture absorption

Moisture absorption was measured in accordance with ASTM D-570.

(8) Mold shrinkage

Using a metal mold (mold cavity: 180 mm×0 mm×3 mm), a test piece was prepared by injection at a nozzle temperature of from 250° to 280° C. and a mold temperature of 70° C. The mold shrinkage of the test piece was determined with respect to the lengthwise direction and crosswise direction, according to the following formula:

$$\text{Mold shrinkage} = \frac{180 - \frac{\text{dimension of test piece in lengthwise or crosswise direction(mm)}}{180}}{} \times 100(\%)$$

(9) Peeling resistance

A dumbbell specimen of ⅛ inch in thickness was subjected to repeated folding at its center portion until it was broken. The resultant cross-section upon breaking was subjected to visual observation and peeling resistance of the dumbbell specimen was evaluated by the following criteria:

○ : any layer structure was not observed; and
X: layers were observed.
Δ: This indicates an intermediate between ○ and X.

(10) Number average particle diameter of graft copolymer rubber

A transmission electron micrograph was taken of a test piece obtained in accordance with ultramicrotomy. From the electron micrograph, the diameters were measured with respect to 1000 particles of the graft copolymer rubber dispersed in the test piece. Then, the number average particle diameter of the graft copolymer rubber was calculated in accordance with the following formula:

$$\text{Number average particle diameter} = \frac{\Sigma n_i D_i}{\Sigma n_i}$$

wherein Di is the diameter of a particle of the graft copolymer rubber and ni is the number of particles of the graft copolymer rubber which have a particle diameter of Di.

Abbreviations used herein have meanings as follows:

MSMAA: copolymer comprising methyl methacrylate units, aromatic vinyl compound units, methacrylic or acrylic acid units, and hexagonal acid anhydride units MBS A: graft copolymer rubber comprising a styrene-butadiene rubber and, grafted thereto, styrene units and methyl methacrylate units [a copolymer comprising 54% by weight of butadiene units, 10% by weight of styrene units and 36% by weight of methyl methacrylate units as obtained by a process comprising the steps of (1) continuously adding an aqueous solution prepared by dissolving 4 parts by weight of styrene, 36 parts by weight of methyl methacrylate and 0.1 part by weight of potassium persulfate in 50 parts by weight of water purified by ion exchange to a mixture of 60 parts by weight, in terms the amount of solid contents, of a latex of a styrene-butadiene rubber composed of 10% by weight of styrene units and 90% by weight of butadiene units and 100 parts by weight of water purified by ion exchange at 70° C. while stirring for 7 hours, thereby effecting polymerization reaction, (2) subjecting the resultant reaction mixture to salting out and dehydration treatments, thereby obtaining a graft copolymer rubber and drying the same]

MBS B: graft copolymer rubber comprising a styrene-butadiene rubber and, grafted thereto, styrene units and methyl methacrylate units (a copolymer comprising 48% by weight of butadiene units, 22% by weight of styrene units and 30% by weight of methyl methacrylate units as obtained by the process described with respect to MBS A)

MBS C: graft copolymer rubber comprising a styrene-butadiene rubber and, grafted thereto, styrene units and methyl methacrylate units (a copolymer comprising 52% by weight of butadiene units, 13% by weight of styrene units and 35% by weight of methyl methacrylate units as obtained by the process described with respect to MBS A)

MBS D: graft copolymer rubber comprising a styrene-butadiene rubber and, grafted thereto, styrene units and methyl methacrylate units (a copolymer comprising 32% by weight of butadiene units, 33% by weight of styrene units and 35% by weight of methyl methacrylate units as obtained by the process described with respect to MBS A)

MABS: graft copolymer rubber comprising a styrene-butadiene rubber and, grafted thereto, styrene units, methyl methacrylate units and acrylonitrile units [a copolymer comprising 48% by weight of butadiene units, 17% by weight of styrene units, 30% by weight of methyl methacrylate units and 5% by weight of acrylonitrile units as obtained by a process comprising the steps of (1) continuously adding an aqueous solution prepared by dissolving 5 parts by weight of styrene, 30 parts by weight of methyl methacrylate, 5 parts by weight of acrylonitrile and 0.1 part by weight of potassium persulfate in 50 parts by weight of water purified by ion exchange to a mixture of 60 parts by weight, in terms of the amount of solid contents, of a latex of a styrene-butadiene rubber composed of 20% by weight of styrene units and 80% by weight of butadiene units and 100 parts by weight of water purified by ion exchange at 70° C. while stirring for 7 hours, thereby effecting polymerization reaction, (2) subjecting the resultant reaction mixture to salting out and dehydration treatments, thereby obtaining a graft copolymer rubber and drying the same]

ABS: acrylonitrile-butadiene-styrene copolymer [two types were used, namely, IM-30 (tradename of ABS produced and sold by Asahi Kasei Kogyo K.K., Japan); and Stylac ABS101 (tradename of an ABS produced and sold by Asahi Kasei Kogyo K.K., Japan)]

HIPS: high impact polystyrene, Styron 492 (Dow Chemical Company, U.S.A.) produced and sold by Asahi Kasei Kogyo K.K., Japan SB block copolymer: styrene-butadiene block copolymer (Tufprene A: tradename of a product produced and sold by Asahi Kasei Kogyo K.K., Japan)

PA-6: polycaprolactam (Leona 2300: tradename of a product produced and sold by Asahi Kasei Kogyo K.K., Japan)

PC: polycarbonate resin (Novarex 7025A: tradename of a product produced and sold by Mitsubishi Chemical Industries, Ltd., Japan)

In Tables 1 to 13, the following abbreviations are used.

With respect to Stylac ABS101, it is referred to simply as "ABS101".

With respect to Styron 492 (HIPS), it is referred to simply as "492".

In the section for amounts of component (A) of each Table, the abbreviations have meanings as follows:

MMA represents methyl methacrylate units and corresponds to units (b) of component (A).

St represents styrene units and corresponds to units (c) of component (A).

α-MeSt represents α-methylstyrene units and corresponds to units (c) of component (A).

MAA represents methacrylic acid units and corresponds to units (d) of component (A).

HA represents hexagonal acid anhydride units of the formula (I) and corresponds to units (a) of component (A).

HI represents hexagonal imide units of the formula (II) an corresponds to units (a) of component (A).

EXAMPLE 1

20 Parts by weight of MSMAA pellets each comprising 30% by weight of methyl methacrylate units, 33% by weight of styrene units, 20% by weight of α-methylstyrene units, 7% by weight of methacrylic acid units and 10% by weight of hexagonal acid anhydride units, 30 parts by weight of powdery MBS A and 50 parts by weight of polycaprolactam pellets (Leona 2300: tradename of a product produced and sold by Asahi Kasei Kogyo K.K., Japan) were mixed to prepare a resin composition. The resin composition was melt-kneaded at 270° C. using a twin-screw extruder having a screw diameter of 30 mm (Model A30 manufactured and sold by Nakatani Kikai K.K., Japan). The resultant resin composition was molded into test pieces for the measurement of the above-mentioned properties using a 5-ounce molding machine at a cylinder temperature of 270° C. and at a mold temperature of 70° C. The thus obtained test pieces had extremely good appearance. With respect to peeling resistance, a very satisfactory result was obtained. Further, the test pieces had excellent physical properties. That is, the test pieces respectively had an Izod impact strength as high as 20 kg.cm/cm, a falling weight impact strength as high as 900 kg.cm, a moisture absorption as low as 1.1% and mold shrinkages in the lengthwise direction and the crosswise direction as low as 0.87% and 0.84% respectively. The results are shown in Table 1.

EXAMPLE 2

Test pieces were prepared in substantially the same manner as in Example 1 except that the amounts of the MSMAA, the MBS and the polycaprolactam were respectively changed to 10 parts by weight, 20 parts by weight and 70 parts by weight. The properties of the test pieces were measured. The results are shown in Table 1.

EXAMPLE 3

Test pieces were prepared in substantially the same manner as in Example 1 except that the amounts of the MSMAA and the MBS were respectively changed to 30 parts by weight and 20 parts by weight. The properties of the test pieces were measured. The results are shown in Table 1.

EXAMPLES 4 to 6

0.5 kg of MAMAA pellets comprising 30% by weight methyl methacrylate units, 33% by weight of styrene units, 5% by weight of α-methylstyrene units, 9% by weight of methacrylic acid units and 23% by weight of hexagonal acid anhydride units was charged into a 5-liter autoclave and then 3.0 kg of dimethylformamide was added thereto. The resultant mixture was stirred until the pellets were completely dissolved in dimethylformamide to prepare a solution. Then, a 28% aqueous ammonia solution was added to the above-prepared solution in an amount such that the amount of ammonia was two times the equivalent weight of the hexagonal acid anhydride units, and reaction was conducted at 150° C. for 2 hours. The resultant reaction mixture was taken out of the autoclave and n-hexane was added to the reaction mixture to deposit a pure copolymer. The copolymer was treated in a volatilization vessel at 250° C. for 2 hours under 10 Torr to prepare an imidized MSMAA.

Test pieces were prepared in substantially the same manner as in Example 1 except that the imidized MSMAA was used instead of MSMAA and that the imidized MSMAA, MBS and polycaprolactam were used in amounts as indicated in Table 1. The properties of the test pieces were measured. The results are shown in Table 1.

TABLE 1

| | | | Example 1 | Example 2 | Example 3 |
|---|---|---|---|---|---|
| formulation | | | | | |
| component (A) | type of copolymer | | MSMAA | MSMAA | MSMAA |
| | proportions of units (% by weight) | | | | |
| | MMA/St/α-MeSt/MAA/HA/HI (b) (c) (c) (d) (a) (a) | | 30/33/20/7/10/0 | 30/33/20/7/10/0 | 30/33/20/7/10/0 |
| | reduced viscosity (dl/g) | | 0.50 | 0.50 | 0.50 |
| | amount (parts by weight) | | 20 | 10 | 30 |
| component (B) | type of graft copolymer rubber | | MBS A | MBS A | MBS A |
| | number average particle diameter ($10^{-4}$ μm) | | 2,500 | 2,500 | 2,500 |
| | amount (parts by weight) | | 30 | 20 | 20 |
| component (C) | type of polymer | | PA-6 | PA-6 | PA-6 |
| | weight average molecular weight | | $5 \times 10^4$ | $5 \times 10^4$ | $5 \times 10^4$ |
| | amount (parts by weight) | | 50 | 70 | 50 |
| properties | | | | | |
| tensile strength at break | | kg/cm$^2$ | 520 | 530 | 580 |
| elongation at yield | | % | >80 | >80 | >80 |
| flexural strength | | kg/cm$^2$ | 790 | 860 | 810 |
| flexural modulus of elasticity | | kg/cm$^2$ | 23,100 | 24,200 | 29,500 |
| Izod impact strength (¼ inch in thickness, notched) | | kg·cm/cm | 20 | 18 | 16 |
| falling weight impact strength (2 mm in thickness) | | kg·cm | 900 | 780 | 710 |
| deflection temperature under load (18.6 kg/cm$^2$) | | °C. | 82 | 73 | 92 |
| melt flow index (250° C./10 kg) | | g/10 min | 2 | 9 | 3 |
| moisture absorption (23° C., 24 hr, immersed in water) | | % | 1.9 | 2.5 | 1.9 |
| mold shrinkage (lengthwise direction/crosswise direction) | | % | 0.87/0.84 | 1.05/1.00 | 0.81/0.80 |

TABLE 1-continued

| | | Example 4 | Example 5 | Example 6 |
|---|---|---|---|---|
| peeling resistance | visual observation | | | |
| sea phase-constituting component | observation by electron microscopy | PA-6 | PA-6 | PA-6 |

| | | | Example 4 | Example 5 | Example 6 |
|---|---|---|---|---|---|
| formulation | | | | | |
| component (A) | type of copolymer | | MSMAA imidized with ammonia | MSMAA imidized with ammonia | MSMAA imidized with ammonia |
| | proportions of units (% by weight) MMa/St/α-MeSt/MAA/HA/HI (b) (c) (c) (d) (a) (a) | | 30/33/5/9/0/23 | 30/33/5/9/0/23 | 30/33/5/9/0/23 |
| | reduced viscosity (dl/g) | | 0.30 | 0.30 | 0.30 |
| | amount (parts by weight) | | 20 | 10 | 30 |
| component (B) | type of graft copolymer rubber | | MBS A | MBS A | MBS A |
| | number average particle 10 ($10^{-4}$ μm) | | 2,500 | 2,500 | 2,500 |
| | amount (parts by weight) | | 30 | 20 | 20 |
| component (C) | type of polymer | | PA-6 | PA-6 | PA-6 |
| | weight average molecular weight | | $5 \times 10^4$ | $5 \times 10^4$ | $5 \times 10^4$ |
| | amount (parts by weight) | | 50 | 70 | 50 |
| properties | | | | | |
| tensile strength at break | | kg/cm$^2$ | 620 | 600 | 690 |
| elongation at yield | | % | >80 | >80 | >80 |
| flexural strength | | kg/cm$^2$ | 860 | 930 | 910 |
| flexural modulus of elasticity | | kg/cm$^2$ | 24,100 | 25,100 | 31,200 |
| Izod impact strength (¼ inch in thickness, notched) | | kg·cm/cm | 17 | 15 | 15 |
| falling weight impact strength (2 mm in thickness) | | kg·cm | 700 | 690 | 650 |
| deflection temperature under load (18.6 kg/cm$^2$) | | °C. | 84 | 78 | 96 |
| melt flow index (250° C./10 kg) | | g/10 min | 5 | 22 | 5 |
| moisture absorption (23° C., 24 hr, immersed in water) | | % | 2.0 | 2.1 | 1.9 |
| mold shrinkage (lengthwise direction/crosswise direction) | | % | 0.85/0.81 | 1.01/0.98 | 0.79/0.78 |
| peeling resistance | visual observation | | | | |
| sea phase-constituting component | observation by electron microscopy | | PA-6 | PA-6 | PA-6 |

EXAMPLE 7

The same MSMAA as used in Example 4 was imidized in the same manner as in Example 4 except that aniline was used instead of ammonia, so that about 60% by weight of the hexagonal acid anhydride units of the MSMAA were converted into N-phenyl substituted hexagonal imide units. Test pieces were prepared in substantially the same manner as in Example 4 except that the MSMAA imidized with aniline was used instead of the MSMAA imidized with ammonia and that the MSMAA imidized with aniline, the MBS and polycaprolactam were used in amounts as indicated in Table 2. The properties of the test pieces were measured. The results are shown in Table 2.

EXAMPLE 8

Test pieces were prepared in substantially the same manner as in Example 1 except that powdery MBS C was used instead of MBS A. The properties of the test pieces were measured. The results are shown in Table 2.

EXAMPLE 9

Test pieces were prepared in substantially the same manner as in Example 1 except that an MSMAA comprising 60% by weight of methyl methacrylate units, 11% by weight of styrene units, 15% by weight of α-methylstyrene units, 3% by weight of methacrylic acid units and 11% by weight of hexagonal acid anhydride units was used instead of the MSMAA used in Example 1. The properties of the test pieces were measured. The results are shown in Table 2.

EXAMPLE 10

Test pieces were prepared in substantially the same manner as in Example 1 except that an MSMAA comprising 51% by weight of methyl methacrylate units, 10% by weight of styrene units, 9% by weight of methacrylic acid units and 30% by weight of hexagonal acid anhydride units was used instead of the MSMAA used in Example 1. The properties of the test pieces were measured. The results are shown in Table 2.

REFERENCE EXAMPLE 1

Test pieces were prepared in substantially the same manner as in Example 1 except that only the polycaprolactam (Leona 2300) was used. The properties of test pieces were measured. The results are shown in Table 2.

TABLE 2

| | | Example 7 | Example 8 | Example 9 |
|---|---|---|---|---|
| formulation | | | | |
| component (A) | type of copolymer | MSMAA imidized with aniline | MSMAA | MSMAA |

TABLE 2-continued

|  |  | | | |
|---|---|---|---|---|
|  | proportions of units (% by weight) MMA/St/α-MeSt/MAA/HA/HI (b) (c) (c) (d) (a) (b) | 30/33/5/9/9/14 | 30/33/20/7/10/0 | 60/11/15/3/11/0 |
|  | reduced viscosity (dl/g) | 0.40 | 0.50 | 0.40 |
|  | amount (parts by weight) | 20 | 20 | 20 |
| component (B) | type of graft copolymer rubber | MBS A | MBS C | MBS A |
|  | number average particle diameter ($10^{-4}$ μm) | 2,500 | 3,300 | 2,500 |
|  | amount (parts by weight) | 30 | 30 | 30 |
| component (C) | type of polymer | PA-6 | PA-6 | PA-6 |
|  | weight average molecular weight | $5 \times 10^4$ | $5 \times 10^4$ | $5 \times 10^4$ |
|  | amount (parts by weight) | 50 | 50 | 50 |
| properties | | | | |
| tensile strength at break | kg/cm$^2$ | 650 | 510 | 500 |
| elongation at yield | % | >80 | >80 | >80 |
| flexural strength | kg/cm$^2$ | 990 | 730 | 780 |
| flexural modulus of elasticity | kg/cm$^2$ | 26,100 | 22,400 | 24,000 |
| Izod impact strength (¼ inch in thickness, notched) | kg · cm/cm | 16 | 18 | 15 |
| falling weight impact strength (2 mm in thickness) | kg · cm | 610 | 850 | 810 |
| deflection temperature under load (18.6 kg/cm$^2$) | °C. | 88 | 83 | 79 |
| melt flow index (250° C./10 kg) | g/10 min | 6 | 3 | 2 |
| moisture absorption 23° C., 24 hr, immersed in water) | % | 2.2 | 1.9 | 1.8 |
| mold shrinkage (lengthwise direction/crosswise direction) | % | 0.86/0.83 | 0.82/0.79 | 0.86/0.85 |
| peeling resistance | visual observation | | | |
| sea phase-constituting component | observation by electron microscopy | PA-6 | PA-6 | PA-6 |

|  |  | | Example 10 | Reference Example 1 |
|---|---|---|---|---|
| formulation | | | | |
| component (A) | type of copolymer | | MSMAA | — |
|  | proportions of units (% by weight) MMA/St/α-MeSt/MAA/HA/HI (b) (c) (c) (d) (a) (a) | | 51/10/0/9/30/0 | — |
|  | reduced viscosity (dl/g) | | 0.50 | — |
|  | amount (parts by weight) | | 20 | — |
| component (B) | type of graft copolymer rubber | | MBS A | — |
|  | number average particle diameter ($10^{-4}$ μm) | | 2,500 | — |
|  | amount (parts by weight) | | 30 | — |
| component (C) | type of polymer | | PA-6 | PA-6 |
|  | weight average molecular weight | | $5 \times 10^4$ | $5 \times 10^4$ |
|  | amount (parts by weight) | | 50 | 100 |
| properties | | | | |
| tensile strength at break | kg/cm$^2$ | | 590 | 830 |
| elongation at yield | % | | >80 | 7 |
| flexural strength | kg/cm$^2$ | | 810 | 1,200 |
| flexural modulus of elasticity | kg/cm$^2$ | | 23,500 | 30,000 |
| Izod impact strength (¼ inch in thickness, notched) | kg · cm/cm | | 16 | 1.9 |
| falling weight impact strength (2 mm in thickness) | kg · cm | | 780 | >1,000 |
| deflection temperature under load (18.6 kg/cm$^2$) | °C. | | 92 | 62 |
| melt flow index (250° C./10 kg) | g/10 min | | 1 | — |
| moisture absorption (23° C., 24 hr, immersed in water) | % | | 1.9 | 3.5 |
| mold shrinkage (lengthwise direction/crosswise direction) | % | | 0.87/0.86 | 1.53/1.40 |
| peeling resistance | visual observation | | | |
| sea phase-constituting component | observation by observation microscopy | | PA-6 | PA-6 |

COMPARATIVE EXAMPLES 1 TO 3

As indicated in Table 3, 20 parts by weight of the same MSMAA as used in Example 1, 30 parts by weight of ABS (Comparative Example 1), HIPS (Comparative Example 2) or SB block copolymer (Comparative Example 3) and 50 parts by weight of the polycaprolactam (Leona 2300) as component (C) were mixed and melt-kneaded in substantially the same manner as in Example 1. Each of the resultant resin compositions was molded using a 5-ounce molding machine at a cylinder temperature of 270° C. and at a mold temperature of 70° C. to obtain test pieces for the measurement of the above-mentioned properties. In the test of peeling resistance, peeling was observed with respect to each of the test pieces of Comparative Examples 1 to 3. Further, each of the test pieces (¼ inch in thickness, notched) of Comparative Examples 1 to 3 had an Izod impact strength as low as from 2 to 5 kg.cm/cm, and each of the test pieces (2 mm in thickness) of Comparative Example 1 to 3 had a falling weight impact strength as low as from 20 to 50 kg.cm. Therefore, it was found that the resin compositions prepared in Comparative Examples 1 to 3 were not practically suitable as a material for injection molding. The results are shown in Table 3.

COMPARATIVE EXAMPLE 4

Test pieces were prepared in substantially the same manner as in Example 1 except that 20 parts by weight of the same MSMAA imidized with ammonia as used in Example 4, 30 parts by weight of ABS101 and 50 parts by weight of the polycaprolactam (Leona 2300) were used to prepare a resin composition. In the test of peeling resistance, peeling was observed at the broken section of the test piece for the measurement of peeling resistance. The test piece (¼ inch in thickness, notched) had an Izod impact strength as low as 4 kg.cm/cm and the test piece (2 mm in thickness) had a falling weight impact strength as low as 35 kg.cm. Therefore, it was found that the resin composition prepared in this Comparative Example was not practically suitable as a material for injection molding. The results are shown in Table 3.

COMPARATIVE EXAMPLE 5

Test pieces were prepared in substantially the same manner as in Example 1 except that 20 parts by weight of the same MSMAA imidized with aniline as used in Example 7, 30 parts by weight of ABS 101 and 50 parts by weight of the polycaprolactam (Leona 2300) were used to prepare a resin composition. In the test of peeling resistance, peeling was observed at the broken section of the test piece for the measurement of peeling resistance. The test piece (¼ inch in thickness, notched) had an Izod impact strength as low as 5 kg.cm/cm, and the test piece (2 mm in thickness) had a falling weight impact strength as low as 33 kg.cm. Therefore, it was found that the resin composition prepared in this Comparative Example was not practically suitable as a material for injection molding. The results are shown in Table 3.

COMPARATIVE EXAMPLE 6

Test pieces were prepared in substantially the same manner as in Example 1 except that the amounts of the MSMAA, the MBS and the polycaprolactam were respectively changed to 2 parts by weight, 28 parts by weight and 70 parts by weight to prepare a resin composition. In the test of peeling resistance, peeling was observed at the broken section of the test piece for the measurement of peeling resistance. The test piece (¼ inch in thickness, notched) had an Izod impact strength as low as 4 kg.cm/cm and the test piece (2 mm in thickness) had a falling weight impact strength as low as 40 kg.cm. Therefore, it was found that the resin composition prepared in this Comparative Example was not practically suitable as a material for injection molding. The results are shown in Table 3.

COMPARATIVE EXAMPLE 7

Test pieces were prepared in substantially the same manner as in Example 1 except that the amounts of the MSMAA, the MBS and the polycaprolactam were respectively changed to 60 parts by weight, 4 parts by weight and 36 parts by weight to prepare a resin composition. Because the amount of the MBS was small, the test piece (¼ inch in thickness, notched) had an Izod impact strength as low as 3 kg.cm/cm and the test piece (2 mm in thickness) had a falling weight impact strength as low as 10 kg.cm. Therefore, it was found that the resin composition prepared in this Comparative Example was not practically suitable as a material for injection molding. The results are shown in Table 3.

TABLE 3

| | | | Comparative Example 1 | Comparative Example 2 | Comparative Example 3 | Comparative Example 4 |
|---|---|---|---|---|---|---|
| formulation | | | | | | |
| component (A) | type of copolymer | | MSMAA | MSMAA | MSMAA | MSMAA imidized with ammonia |
| | proportions of units (% by weight) MMA/St/α-MeSt/MAA/HA/HI (b) (c) (c) (d) (a) (a) | | 30/33/20/7/10/0 | 30/33/20/7/10/0 | 30/33/20/7/10/0 | 30/33/5/9/0/23 |
| | reduced viscosity (dl/g) | | 0.50 | 0.50 | 0.50 | 0.30 |
| | amount (parts by weight) | | 20 | 20 | 20 | 20 |
| component (B) | type of graft copolymer rubber | | ABS101 | HIPS (492) | SB block copolymer (Tufprene A) | ABS101 |
| | number average particle diameter ($10^{-4}$ μm) | | — | — | — | — |
| | amount (parts by weight) | | 30 | 30 | 30 | 30 |
| component (C) | type of polymer | | PA-6 | PA-6 | PA-6 | PA-6 |
| | weight average molecular weight | | $5 \times 10^4$ | $5 \times 10^4$ | $5 \times 10^4$ | $5 \times 10^4$ |
| | amount (parts by weight) | | 50 | 50 | 50 | 50 |
| properties | | | | | | |
| tensile strength at break | | kg/cm$^2$ | 510 | 420 | 470 | 600 |
| elongation at yield | | % | 50 | 25 | 35 | 32 |
| flexural strength | | kg/cm$^2$ | 790 | 710 | 720 | 900 |
| flexural modulus of elasticity | | kg/cm$^2$ | 22,500 | 21,000 | 22,000 | 24,000 |
| Izod impact strength (¼ inch in thickness, notched) | | kg·cm/cm | 5 | 2 | 4 | 4 |
| falling weight impact strength (2 mm in thickness) | | kg·cm | 50 | 20 | 35 | 35 |
| deflection temperature under load (18.6 kg/cm$^2$) | | °C. | 79 | 78 | 77 | 80 |
| melt flow index (250° C./10 kg) | | g/10 min | 1 | 3 | 1 | 4 |
| moisture absorption (23° C., 24 hr, immersed in water) | | % | 1.9 | 1.8 | 1.8 | 2.1 |
| mold shrinkage (lengthwise direction/crosswise direction) | | % | 0.86/0.83 | 0.89/0.87 | 0.88/0.85 | 0.87/0.85 |

TABLE 3-continued

| | | | | | |
|---|---|---|---|---|---|
| peeling resistance | visual observation | X | X | X | X |
| sea phase-constituting component | observation by electron microscopy | PA-6 | PA-6 | PA-6 | PA-6 |

| | | | Comparative Example 5 | Comparative Example 6 | Comparative Example 7 |
|---|---|---|---|---|---|
| formulation | | | | | |
| | type of copolymer | | MSMAA imidized with aniline | MSMAA | MSMAA |
| | proportions of units (% by weight) | | 30/33/5/9/9/14 | 30/33/20/7/10/0 | 30/33/20/7/10/0 |
| component (A) | MMA/St/α-MeSt/MAA/HA/HI (b) (c) (c) (d) (a) (a) | | | | |
| | reduced viscosity (dl/g) | | 0.40 | 0.50 | 0.50 |
| | amount (parts by weight) | | 20 | 2 | 30 |
| component (B) | type of graft copolymer rubber | | ABS101 | MBS A | MBS A |
| | number average particle diameter ($10^{-4}$ μm) | | — | 2,500 | 2,500 |
| | amount (parts by weight) | | 30 | 28 | 35 |
| component (C) | type of polymer | | PA-6 | PA-6 | PA-6 |
| | weight average molecular weight | | $5 \times 10^4$ | $5 \times 10^4$ | $5 \times 10^4$ |
| | amount (parts by weight) | | 50 | 70 | 35 |
| properties | | | | | |
| tensile strength at break | | kg/cm² | 590 | 510 | 460 |
| elongation at yield | | % | 40 | 65 | 8 |
| flexural strength | | kg/cm² | 910 | 710 | 710 |
| flexural modulus of elasticity | | kg/cm² | 24,100 | 23,100 | 22,000 |
| Izod impact strength (¼ inch in thickness notched) | | kg · cm/cm | 5 | 4 | 5 |
| falling weight impact strength (2 mm in thickness) | | kg · cm | 33 | — | — |
| deflection temperature under load (18.6 kg/cm²) | | °C. | 81 | 61 | 77 |
| melt flow index (250° C./10 kg) | | g/10 min | 3 | 5 | 2 |
| moisture absorption (23° C., 24 hr, immersed in water) | | % | 2.2 | 2.6 | 1.1 |
| mold shrinkage (lengthwise direction/crosswise direction) | | % | 0.89/0.84 | 1.39/1.21 | 0.69/0.67 |
| peeling resistance | visual observation | | X | X | |
| sea phase-constituting component | observation by electron microscopy | | PA-6 | PA-6 | MSMAA |

COMPARATIVE EXAMPLE 8

Test pieces were prepared in substantially the same manner as in Example 1 except that 50 parts by weight of the same MSMAA as used in Example 1 and 50 parts by weight of the polycaprolactam were used. The properties of the test pieces were measured. The results are shown in Table 4.

COMPARATIVE EXAMPLE 9

Test pieces were prepared in substantially the same manner as in Example 1 except that 50 parts by weight of the same imidized MSMAA as used in Example 4 and 50 parts by weight of the polycaprolactam were used. The properties of the test pieces were measured. The results are shown in Table 4.

COMPARATIVE EXAMPLE 10

Test pieces were prepared in substantially the same manner as in Example 1 except that 32 parts by weight of an MSMAA comprising 12% by weight of methyl methacrylate units, 33% by weight of styrene units, 20% by weight of α-methylstyrene units, 10% by weight of methacrylic acid units and 25% by weight of hexagonal acid anhydride units, 18 parts by weight of MBS A and 50 parts by weight of the polycaprolactam were used. The properties of the test pieces were measured. The results are shown in Table 4.

COMPARATIVE EXAMPLE 11

Test pieces were prepared in substantially the same manner as in Example 1 except that 32 parts by weight of an MSMAA comprising 53% by weight of methyl methacrylate units, 25% by weight of styrene units, 0.5% by weight of α-methylstyrene units and 1.5% by weight of hexagonal acid anhydride units, 18 part by weight of MBS A and 50 parts by weight of the polycaprolactam were used. The properties of the test pieces were measured. The results are shown in Table 4.

COMPARATIVE EXAMPLES 12 AND 13

Test pieces were prepared in substantially the same manner as in Example 1 except that powdery MBS D was used as component (B) (Comparative Example 12) and an MSMAA comprising 10% by weight of methyl methacrylate units, 45% by weight of styrene units, 38% by weight of α-methylstyrene units, 2% by weight of methacrylic acid units and 5% by weight of hexagonal acid anhydride units was used as component (A) (Comparative Example 13). The properties of the test pieces were measured. The results are shown in Table 4. The resin composition of Comparative Example 12 had poor appearance. That is, flow mark etc. were observed on the surface of the resin composition.

COMPARATIVE EXAMPLE 14

Test pieces were prepared in substantially the same manner as in Example 1 except that MBS B was used instead of MBS A used in Example 1. The properties of the test pieces were measured. The results are shown in Table 4.

COMPARATIVE EXAMPLES 15 AND 16

Test pieces were prepared in substantially the same manner as in Example 1 except that the amounts of the MSMAA, the MBS and the polycaprolactam were respectively changed to 40 parts by weight, 45 parts by weight and 15 parts by weight (Comparative Example 15) or 35 parts by weight, 40 parts by weight and 25 parts by weight (Comparative Example 16). The properties of the test pieces were measured. The results are shown in Table 4.

TABLE 4

| | | | Comparative Example 8 | Comparative Example 9 | Comparative Example 10 | Comparative Example 11 |
|---|---|---|---|---|---|---|
| component (A) | type of copolymer formulation | | MSMAA | MSMAA imidized with ammonia | MSMAA | MSMAA |
| | proportions of units (% by weight) MMA/St/α-MeSt/MAA/HA/HI (b) (c) (c) (d) (a) (a) | | 30/33/20/7/10/0 | 30/33/5/9/0/23 | 12/33/20/10/25/0 | 53/25/20/0.5/1.5/0 |
| | reduced viscosity (dl/g) | | 0.50 | 0.30 | 0.50 | 0.50 |
| | amount (parts by weight) | | 50 | 50 | 32 | 32 |
| component (B) | type of graft copolymer rubber | | — | — | MBS A | MBS A |
| | number average particle diameter ($10^{-4}$ μm) | | — | — | 2,500 | 2,500 |
| | amount (parts by weight) | | — | — | 18 | 18 |
| component (C) | type of polymer | | PA-6 | PA-6 | PA-6 | PA-6 |
| | weight average molecular weight | | $5 \times 10^4$ | $5 \times 10^4$ | $5 \times 10^4$ | $5 \times 10^4$ |
| | amount (parts by weight) | | 50 | 50 | 50 | 50 |
| properties | | | | | | |
| tensile strength at break | kg/cm² | | 690 | 650 | 490 | 530 |
| elongation at yield | % | | 4 | 4 | 21 | >80 |
| flexural strength | kg/cm² | | 1,440 | 1,310 | 780 | 810 |
| flexural modulus of elasticity | kg/cm² | | 38,600 | 39,000 | 22,300 | 23,100 |
| Izod impact strength (¼ inch in thickness, notched) | kg·cm/cm | | 2 | 2 | 5 | 10 |
| falling weight impact strength (2 mm in thickness) | kg·cm | | 33 | 30 | — | — |
| deflection temperature under load (18.6 kg/cm²) | °C. | | 91 | 93 | 96 | 62 |
| melt flow index (250° C./10 kg) | g/10 min | | 12 | 10 | 3 | 13 |
| moisture absorption (23° C., 24 hr, immersed in water) | % | | 1.8 | 2.0 | 1.7 | 1.9 |
| mold shrinkage (lengthwise direction/crosswise direction) | % | | 0.79/0.78 | 0.78/0.77 | 0.91/0.89 | 0.88/0.87 |
| peeling resistance | visual observation | | | | | |
| sea phase-constituting component | observation by electron microscopy | | PA-6 | PA-6 | PA-6 | PA-6 |

| | | | Comparative Example 12 | Comparative Example 13 | Comparative Example 14 |
|---|---|---|---|---|---|
| component (A) | type of copolymer formulation | | MSMAA | MSMAA | MSMAA |
| | proportions of units (% by weight) MMA/St/α-MeSt/MAA/HA/HI (b) (c) (c) (d) (a) (a) | | 30/33/20/7/10/0 | 10/45/38/2/5/0 | 30/33/20/7/10/0 |
| | reduced viscosity (dl/g) | | 0.50 | 0.60 | 0.50 |
| | amount (parts by weight) | | 20 | 20 | 20 |
| component (B) | type of graft copolymer rubber | | MBS D | MBS A | MBS B |
| | number average particle diameter ($10^{-4}$ μm) | | 20,000 | 2,500 | 500 |
| | amount (parts by weight) | | 30 | 30 | 30 |
| | type of polymer | | PA-6 | PA-6 | PA-6 |
| component (C) | weight average molecular weight | | $5 \times 10^4$ | $5 \times 10^4$ | $5 \times 10^4$ |
| | amount (parts by weight) | | 50 | 50 | 50 |
| properties | | | | | |
| tensile strength at break | kg/cm² | | 530 | 420 | 510 |
| elongation at yield | % | | >80 | 4 | >80 |
| flexural strength | kg/cm² | | 810 | 900 | 760 |
| flexural modulus of elasticity | kg/cm² | | 23,200 | 23,200 | 22,800 |
| Izod impact strength (¼ inch in thickness, notched) | kg·cm/cm | | 18 | 6 | 10 |
| falling weight impact strength (2 mm in thickness) | kg·cm | | 890 | — | — |
| deflection temperature under load (18.6 kg/cm²) | °C. | | 81 | 83 | 80 |
| melt flow index (1250° C./10 kg) | g/10 min | | 6 | 8 | 4 |

TABLE 4-continued

|  |  |  |  |  |  |
|---|---|---|---|---|---|
| moisture absorption (23° C., 24 hr, immersed in water) | % | 1.9 | 1.3 | 1.8 |
| mold shrinkage (lengthwise direction/crosswise direction) | % | 0.87/0.86 | 0.72/0.71 | 0.86/0.85 |
| peeling resistance | visual observation |  |  |  |
| sea phase-constituting component | observation by electron microscopy | PA-6 | PA-6 | PA-6 |

|  |  |  | Comparative Example 15 | Comparative Example 16 | Comparative Example 17 |
|---|---|---|---|---|---|
| component (A) | type of copolymer formulation |  | MSMAA | MSMAA |  |
|  | proportions of units (% by weight) MMA/St/α-MeSt/MAA/HA/HI (b) (c) (c) (d) (a) (a) |  | 30/33/20/7/10/0 | 30/33/20/7/10/0 | — |
|  | reduced viscosity (dl/g) |  | 0.50 | 0.50 | — |
|  | amount (parts by weight) |  | 40 | 35 | — |
| component (B) | type of graft copolymer rubber |  | MBS A | MBS A | MBS A |
|  | number average particle diameter ($10^{-4}$ μm) |  | 2,500 | 2,500 | 2,500 |
|  | amount (parts by weight) |  | 45 | 40 | 30 |
| component (C) | type of polymer |  | PA-6 | PA-6 | PA-6 |
|  | weight average molecular weight |  | $5 \times 10^4$ | $5 \times 10^4$ | $5 \times 10^4$ |
|  | amount (parts by weight) |  | 15 | 25 | 70 |
| Properties |  |  |  |  |  |
| tensile strength at break | kg/cm$^2$ |  | 410 | 430 |  |
| elongation at yield | % |  | 15 | 12 |  |
| flexural strength | kg/cm$^2$ |  | 690 | 700 |  |
| flexural modulus of elasticity | kg/cm$^2$ |  | 20,500 | 21,000 |  |
| Izod impact strength (¼ inch in thickness, notched) | kg·cm/cm |  | 4.5 | 5 | pelletizing cannot be performed |
| falling weight impact strength (2 mm in thickness) | kg·cm |  | — | — |  |
| deflection temperature under load (18.6 kg/cm$^2$) | °C. |  | 81 | 80 |  |
| melt flow index (250° C./10 kg) | g/10 min |  | 1 | 2 |  |
| moisture absorption (23° C., 24 hr, immersed in water) | % |  | 0.65 | 0.75 |  |
| mold shrinkage (lengthwise direction/crosswise direction) | % |  | 0.58/0.56 | 0.62/0.59 |  |
| peeling resistance | visual observation |  |  |  |  |
| sea phase-constituting component | observation by electron microscopy |  | MSMAA | MSMAA |  |

EXAMPLES 11 TO 13

An MSMAA comprising 30% by weight of methyl methacrylate units, 33% by weight of styrene units, 20% by weight of α-methylstyrene units, 7% by weight of methacrylic acid units and 10% by weight of hexagonal acid anhydride units (ηsp/c=0.60 dl/g), MBS A and a polycarbonate resin having a weight average molecular weight of 23,500 (Novarex 7025A), were mixed in the amount ratios indicated in Table 5, and melt-kneaded at 300° C. using a twin-screw extruder having a screw diameter of 30 mm (Model A30 manufactured and sold by Nakatani Kikai K.K., Japan). The resultant resin composition was injection-molded using an injection molding machine, to thereby obtain test pieces. The properties of the test pieces were measured. The results are shown in Table 5.

EXAMPLES 14 TO 16

Substantially the same procedure as in Example 11 was repeated, except that an MSMAA comprising 33% by weight of methyl methacrylate units, 37% by weight of styrene units, 7% by weight of methacrylic acid units and 23% by weight of hexagonal acid anhydride units (0 sp/c=0.60 dl/g) was used in Example 14, an MSMAA imidized with ammonia comprising 30% by weight of methyl methacrylate units, 33% by weight of styrene units, 5% by weight of α-methylstyrene units, 9% by weight of methacrylic acid units and 23% by weight of hexagonal imide units (ηsp/c=0.30 dl/g) was used in Example 15, and an MSMAA imidized with aniline comprising 30% by weight of methyl methacrylate units, 33% by weight of styrene units, 5% by weight of α-methylstyrene units, 9% by weight of methacrylic acid units, 9% by weight of hexagonal acid anhydride units and 14% by weight of hexagonal imide units (ηsp/c=0.40 dl/g) was used in Example 16, instead of the MSMAA, to thereby obtain test pieces. The properties of the test pieces were measured. The results are shown in Table 5.

TABLE 5

|  | Example 11 | Example 12 | Example 13 |
|---|---|---|---|
| type of copolymer formulation | MSMAA | MSMAA | MSMAA |
| proportions of units (% by weight) |  |  |  |

TABLE 5-continued

| | | | | | |
|---|---|---|---|---|---|
| component (A) | MMA/St/α-MeSt/MAA/HA/HI (b) (c) (c) (d) (a) (a) | | 30/33/20/7/10/0 | 30/33/20/7/10/0 | 30/33/20/7/10/0 |
| | reduced viscosity (dl/g) | | 0.50 | 0.50 | 0.50 |
| | amount (parts by weight) | | 25 | 32 | 37 |
| component (B) | type of graft copolymer rubber | | MBS A | MBS A | MBS A |
| | number average particle diameter ($10^{-4}$ μm) | | 2,500 | 2,500 | 2,500 |
| | amount (parts by weight) | | 25 | 18 | 13 |
| | type of polymer | | PC | PC | PC |
| component (C) | weight average molecular weight | | 23,500 | 23,500 | 23,500 |
| | amount (parts by weight) | | 50 | 50 | 50 |
| properties | | | | | |
| tensile strength at break | kg/cm² | | 480 | 530 | 600 |
| elongation at yield | % | | >80 | >80 | >80 |
| flexural strength | kg/cm² | | 750 | 850 | 930 |
| flexural modulus of elasticity | kg/cm² | | 21,200 | 23,500 | 25,900 |
| Izod impact strength (¼ inch in thickness, notched) | kg·cm/cm | | 60 | 56 | 42 |
| falling weight impact strength (2 mm in thickness) | kg·cm | | >1,000 | >1,000 | >1,000 |
| deflection temperature under load (18.6 kg/cm²) | °C. | | 121 | 122 | 123 |
| melt flow index (250° C./10 kg) | g/10 min | | 7 | 10 | 12 |
| peeling resistance | visual observation | | | | |
| sea phase-constituting component | observation by electron microscopy | | PC | PC | PC |

| | | | Example 14 | Example 15 | Example 16 |
|---|---|---|---|---|---|
| | type of copolymer | | MSMAA | MSMAA imidized with ammonia | MSMAA imidized with aniline |
| | formulation | | | | |
| | proportions of units (% by weight) | | | | |
| component (A) | MMA/St/α-MeSt/MAA/HA/HI (b) (c) (c) (d) (a) (a) | | 33/37/0/7/23/0 | 30/33/5/9/0/23 | 30/33/5/9/9/14 |
| | reduced viscosity (dl/g) | | 0.55 | 0.30 | 0.40 |
| | amount (parts by weight) | | 32 | 32 | 32 |
| component (B) | type of graft copolymer rubber | | MBS A | MBS A | MBS A |
| | number average particle diameter ($10^{-4}$ μm) | | 2,500 | 2,500 | 2,500 |
| | amount (parts by weight) | | 18 | 18 | 18 |
| | type of polymer | | PC | PC | PC |
| component (C) | weight average molecular weight | | 23,500 | 23,500 | 23,500 |
| | amount (parts by weight) | | 50 | 50 | 50 |
| properties | | | | | |
| tensile strength at break | kg/cm² | | 520 | 580 | 590 |
| elongation at yield | % | | >80 | >80 | >80 |
| flexural strength | kg/cm² | | 850 | 960 | 870 |
| flexural modulus of elasticity | kg/cm² | | 23,000 | 24,500 | 24,000 |
| Izod impact strength (¼ inch in thickness, notched) | kg·cm/cm | | 47 | 38 | 37 |
| falling weight impact strength (2 mm in thickness) | kg·cm | | >1,000 | 780 | 790 |
| deflection temperature under load (18.6 kg/cm²) | °C. | | 120 | 123 | 123 |
| melt flow index (250° C./10 kg) | g/10 min | | 5 | 5 | 6 |
| peeling resistance | visual observation | | | | |
| sea phase-constituting component | observation by electron microscopy | | PC | PC | PC |

EXAMPLE 17

Substantially the same procedure as in Example 11 was repeated, except that 22 parts by weight of MSMAA, 18 parts by weight of MBS and 60 parts by weight of PC were used, to thereby obtain test pieces. The properties of the test pieces were measured. The results are shown in Table 6.

EXAMPLE 18

Substantially the same procedure as in Example 11 was repeated, except that 12 parts by weight of MSMAA, 18 parts by weight of MBS and 70 parts by weight of PC were used, to thereby obtain test pieces. The properties of the test pieces were determined. The results are shown in Table 6.

EXAMPLE 19

Substantially the same procedure as in Example 12 was repeated, except that an MSMAA comprising 60% by weight of methyl methacrylate units, 11% by weight of styrene units, 15% by weight of α-methylstyrene units, 3% by weight of methacrylic acid units and 11% by weight of hexagonal acid anhydride units ($\eta sp/c = 0.5$ dl/g) was used instead of the MSMAA used in Example 12, to thereby obtain test pieces. The properties of the test pieces were measured. The results are shown in Table 6.

EXAMPLE 20

Substantially the same procedure as in Example 12 was repeated, except that an MSMAA comprising 51% by weight of methyl methacrylate units, 10% by weight of styrene units, 9% by weight of methacrylic acid units and 30% by weight of hexagonal acid anhydride units ($\eta sp/c = 0.5$ dl/g) was used instead of the MSMAA used in Example 12, to thereby obtain test pieces. The properties of the test pieces were measured. The results are shown in Table 6.

REFERENCE EXAMPLE 2

Substantially the same procedure as in Example 1 was repeated, except that only a PC (Novarex 7025A) was used, to thereby obtain test pieces. The properties of the test pieces were measured. The results are shown in Table 6.

COMPARATIVE EXAMPLE 18

Substantially the same procedure as in Example 11 was repeated, except that 20 parts by weight of MSMAA, 30 parts by weight of an ABS (IM-30: tradename of a product produced and sold by Asahi Kasei Kogyo K.K., Japan) instead of the MBS used in Example 11, and 50 parts by weight of PC were used, and the melt-kneading temperature was changed to 280° C., to thereby obtain test pieces. The properties of the test pieces were measured. The results are shown in Table 7.

TABLE 6

| | | | Example 17 | Example 18 | Example 19 |
|---|---|---|---|---|---|
| component (A) | type of copolymer formulation | | MSMAA | MSMAA | MSMAA |
| | proportions of units (% by weight) MMA/St/α-MeSt/MAA/HA/HI (b) (c) (c) (d) (a) (a) | | 30/33/20/7/10/0 | 30/33/20/7/10/0 | 60/11/15/3/11/0 |
| | reduced viscosity (dl/g) | | 0.50 | 0.50 | 0.50 |
| | amount (parts by weight) | | 22 | 12 | 32 |
| component (B) | type of graft copolymer rubber | | MBS A | MBS A | MBS A |
| | number average particle diameter ($10^{-4}$ μm) | | 2,500 | 2,500 | 2,500 |
| | amount (parts by weight) | | 18 | 18 | 18 |
| component C | type of polymer | | PC | PC | PC |
| | weight average molecular weight | | 23,500 | 23,500 | 23,500 |
| | amount (parts by weight) | | 60 | 70 | 50 |
| properties | | | | | |
| tensile strength at break | | kg/cm² | 490 | 450 | 510 |
| elongation at yield | | % | >80 | >80 | >80 |
| flexural strength | | kg/cm² | 820 | 720 | 810 |
| flexural modulus of elasticity | | kg/cm² | 22,000 | 20,500 | 22,900 |
| Izod impact strength (¼ inch in thickness, notched) | | kg · cm/cm | 58 | 61 | 49 |
| falling weight impact strength (2 mm in thickness) | | kg · cm | >1,000 | >1,000 | >1,000 |
| deflection temperature under load (18.6 kg/cm²) | | °C. | 122 | 124 | 119 |
| melt flow index (250° C./10 kg) | | g/10 min | 9 | 8 | 12 |
| peeling resistance | | visual observation | | | |
| sea phase-constituting component | | observation by electron microscopy | PC | PC | PC |

| | | | Example 20 | Reference Example 2 |
|---|---|---|---|---|
| component (A) | type of copolymer formulation | | MSMAA | — |
| | proportions of units (% by weight) MMA/St/α-MeSt/MAA/HA/HI (b) (c) (c) (d) (a) (a) | | 51/10/0/9/30/0 | — |
| | reduced viscosity (dl/g) | | 0.50 | — |
| | amount (parts by weight) | | 32 | — |
| component (B) | type of graft copolymer rubber | | MBS A | — |
| | number average particle diameter ($10^{-4}$ μm) | | 2,500 | — |
| | amount (parts by weight) | | 18 | — |
| component (C) | type of polymer | | PC | PC |
| | weight average molecular weight | | 23,500 | 23,500 |
| | amount (parts by weight) | | 50 | 100 |
| properties | | | | |
| tensile strength at break | | kg/cm² | 600 | 600 |
| elongation at yield | | % | >80 | >80 |
| flexural strength | | kg/cm² | 850 | 1,040 |
| flexural modulus of elasticity | | kg/cm² | 23,300 | 26,200 |
| Izod impact strength (¼ inch in thickness, notched) | | kg · cm/cm | 55 | 14 |
| falling weight impact strength (2 mm in thickness) | | kg · cm | >1,000 | >1,000 |
| deflection temperature under load (18.6 kg/cm²) | | °C. | 123 | 135 |
| melt flow index (250° C./10 kg) | | g/10 min | 3 | 15 |
| peeling resistance | | visual observation | | |
| sea phase-constituting component | | observation by electron microscopy | PC | PC |

COMPARATIVE EXAMPLE 19

Substantially the same procedure as in Example 15 was repeated, except that 20 parts by weight of MSMAA imidized with ammonia, 30 parts by weight of ABS (IM-30: tradename of a product produced and sold by Asahi Kasei Kogyo K.K., Japan), instead of the MBS used in Example 15, and 50 parts by weight of PC were used, and the melt-kneading temperature was changed to 280° C., to thereby obtain test pieces. The properties of the test pieces were measured. The results are shown in Table 7.

COMPARATIVE EXAMPLE 20

Substantially the same procedure as in Example 15 was repeated, except that 20 parts by weight of MSMAA, 30 parts by weight of HIPS (Styron 492), instead of the MBS used in Example 11, and 50 parts by weight of PC were used, and the melt-kneading temperature was changed to 280° C., to thereby obtain test pieces. The properties of the test pieces were measured. The results are shown in Table 7.

COMPARATIVE EXAMPLE 21

Substantially the same procedure as in Example 1 was repeated, except that 30 parts by weight of MSMAA, 20 parts by weight of an SB block copolymer (Tufprene A) instead of the MBS used in Example 11, and 50 parts by weight of PC were used, and the melt-kneading temperature was changed to 280° C., to thereby obtain test pieces. The properties of the test pieces were measured. The results are shown in Table 7.

COMPARATIVE EXAMPLE 22

Substantially the same procedure as in Example 11 was repeated, except that the proportions of the components were changed so that 2 parts by weight of MSMAA, 38 parts by weight of MBS and 60 parts by weight of PC were employed, to thereby obtain test pieces. The properties of the test pieces were measured. The results are shown in Table 7.

COMPARATIVE EXAMPLE 23

Substantially the same procedure as in Example 11 was repeated, except that the proportions of the components were changed so that 50 parts by weight of MSMAA, 15 parts by weight of MBS and 35 parts by weight of PC were employed, to thereby obtain test pieces. The properties of the test pieces were measured. The results are shown in Table 7.

COMPARATIVE EXAMPLE 24

Substantially the same procedure as in Example 11 was repeated, except that 50 parts by weight of ABS101 and 50 parts by weight of PC were used, and the melt-kneading temperature was changed to 280° C., to thereby obtain test pieces. The properties of the test pieces were measured. The results are shown in Table 7.

COMPARATIVE EXAMPLE 25

Substantially the same procedure described in Example 11 was repeated, except that the proportions of the components were changed so that 70 parts by weight of MSMAA, 15 parts by weight of MBS A and 15 parts by weight of PC were employed, to thereby obtain test pieces. The properties of the test pieces were determined. The results are shown in Table 7.

TABLE 7

| | | | Comparative Example 18 | Comparative Example 19 | Comparative Example 20 | Comparative Example 21 |
|---|---|---|---|---|---|---|
| formulation | | | | | | |
| component (A) | type of copolymer | | MSMAA | MSMAA imidized with ammonia | MSMAA | MSMAA |
| | proportions of units (% by weight) MMA/St/α-MeSt/MAA/HA/HI (b) (c) (c) (d) (a) (a) | | 30/33/20/7/10/0 | 30/33/5/9/0/23 | 30/33/20/7/10/0 | 30/33/20/7/10/0 |
| | reduced viscosity (dl/g) | | 0.50 | 0.30 | 0.50 | 0.50 |
| | amount (parts by weight) | | 20 | 20 | 20 | 30 |
| component (B) | type of graft copolymer rubber | | ABS (IM-30) | ABS (IM-30) | HIPS (492) | SB block copolymer (Tufprene A) |
| | number average particle diameter ($10^{-4}$ μm) | | — | — | — | — |
| | amount (parts by weight) | | 30 | 30 | 30 | 20 |
| component (C) | type of polymer | | PC | PC | PC | PC |
| | weight average molecular weight | | 23,500 | 23,500 | 23,500 | 23,500 |
| | amount (parts by weight) | | 50 | 50 | 50 | 50 |
| properties | | | | | | |
| tensile strength at break | | kg/cm$^2$ | 570 | 580 | 410 | 510 |
| elongation at yield | | % | >80 | >80 | 5 | 60 |
| flexural strength | | kg/cm$^2$ | 1,050 | 1,120 | 870 | 780 |
| flexural modulus of elasticity | | kg/cm$^2$ | 29,200 | 30,500 | 26,700 | 21,800 |
| Izod impact strength (¼ inch in thickness, notched) | | kg·cm/cm | 18 | 6 | 4 | 8 |
| falling weight impact strength (2 mm in thickness) | | kg·cm | 45 | 30 | — | — |
| deflection temperature under load (18.6 kg/cm$^2$) | | °C. | 113 | 115 | 110 | 112 |
| melt flow index (250° C./10 kg) | | g/10 min | 15 | 16 | 30 | 7 |
| peeling resistance | | visual observation | Δ | Δ | X | X |
| sea phase-constituting component | | observation by electron microscopy | PC | PC | PC | PC |

| | | | Comparative Example 22 | Comparative Example 23 | Comparative Example 24 | Comparative Example 25 |
|---|---|---|---|---|---|---|
| formulation | | | | | | |

TABLE 7-continued

| component (A) | type of copolymer | | MSMAA | MSMAA | — | MSMAA |
|---|---|---|---|---|---|---|
| | proportions of units (% by weight) MMA/St/α-MeSt/MAA/HA/HI (b) (c) (c) (d) (a) (a) | | 30/33/20/7/10/0 | 30/33/20/7/10/0 | | 30/33/20/7/10/0 |
| | reduced viscosity (dl/g) | | 0.50 | 0.50 | — | 0.50 |
| | amount (parts by weight) | | 2 | 50 | — | 70 |
| component (B) | type of graft copolymer rubber | | MBS A | MBS A | ABS101 | MBS A |
| | number average particle diameter ($10^{-4}$ μm) | | 2,500 | 2,500 | — | 2,500 |
| | amount (parts by weight) | | 38 | 15 | 50 | 15 |
| component (C) | type of polymer | | PC | PC | PC | PC |
| | weight average molecular weight | | 23,500 | 23,500 | 23,500 | 23,500 |
| | amount (parts by weight) | | 60 | 35 | 50 | 15 |
| properties | | | | | | |
| tensile strength at break | | kg/cm$^2$ | 290 | 580 | 520 | 600 |
| elongation at yield | | % | >80 | >80 | >80 | >80 |
| flexural strength | | kg/cm$^2$ | 450 | 950 | 830 | 980 |
| flexural modulus of elasticity | | kg/cm$^2$ | 15,000 | 24,300 | 23,200 | 25,000 |
| Izod impact strength (¼ inch in thickness, notched) | | kg · cm/cm | 35 | 10 | 58 | 7 |
| falling weight impact strength (2 mm in thickness) | | kg · cm | — | — | >1,000 | — |
| deflection temperature under load (18.6 kg/cm$^2$) | | °C. | 100 | 103 | 98 | 113 |
| melt flow index (250° C./10 kg) | | g/10 min | 6 | 13 | 22 | 10 |
| peeling resistance | | visual observation | Δ | | | |
| sea phase-constituting component | | observation by electron microscopy | PC | MSMAA | PC | MSMAA |

COMPARATIVE EXAMPLE 26

Substantially the same procedure as in Example 11 was repeated, except that the proportions of the components were changed so that 70 parts by weight of MSMAA (no MBS added) and 30 parts by weight of PC were employed, to thereby obtain test pieces. The properties of the test pieces were measured. The results are shown in Table 8.

As is apparent from the results, the resin composition had excellent heat resistance and rigidity, but the izod impact strength thereof was as small as 3 kg.cm/cm, and layer peeling was also observed.

COMPARATIVE EXAMPLE 27

Substantially the same procedure as in Example 15 was repeated, except that the proportions of the components were changed so that 70 parts by weight of MSMAA imidized with ammonia and 30 parts by weight of PC were employed, to thereby obtain test pieces. The properties of the test pieces were determined. The results are shown in Table 8.

As is apparent from the results, the resin composition had excellent heat resistance and rigidity, but the izod impact strength thereof was as small as 2 kg.cm/cm, and layer peeling was also observed.

COMPARATIVE EXAMPLES 28 AND 29

Substantially the same procedure as in Example 11 was repeated, except that the MSMAA used in Example 11 was changed to an MSMAA having the proportions of units and ηsp/c indicated in Table 8, and the proportions of the components were changed so that 32 parts by weight of MSMAA, 18 parts by weight of MBS and 50 parts by weight of PC were employed, to thereby obtain test pieces. The properties of the test pieces were measured. The results are shown in Table 8.

COMPARATIVE EXAMPLE 30

Substantially the same procedure as in Example 15 was repeated, except that the proportions of the components were changed so that 60 parts by weight of MSMAA imidized with ammonia, 15 parts by weight of MBS A and 25 parts by weight of PC were employed, to thereby obtain test pieces. The properties of the test pieces were measured. The results are shown in Table 8.

COMPARATIVE EXAMPLE 31

Substantially the same procedure as Example 11 was repeated, except that MBS A was changed to MBS B to thereby obtain test pieces. The properties of the test pieces were measured. The results are shown in Table 8.

TABLE 8

| | | | Comparative Example 26 | Comparative Example 27 | Comparative Example 28 |
|---|---|---|---|---|---|
| formulation | | | | | |
| component (A) | type of copolymer | | MSMAA | MSMAA imidized with ammonia | MSMAA |
| | proportions of units (% by weight) MMA/St/α-MeSt/MAA/HA/HI (b) (c) (c) (d) (a) (a) | | 30/33/20/7/10/0 | 30/33/5/9/0/23 | 12/33/20/10/25/0 |
| | reduced viscosity (dl/g) | | 0.50 | 0.30 | 0.50 |
| | amount (parts by weight) | | 70 | 70 | 32 |
| component (B) | type of graft copolymer rubber | | — | — | MBS A |
| | number average particle diameter ($10^{-4}$ μm) | | — | — | 2,500 |
| | amount (parts by weight) | | — | — | 18 |
| component (C) | type of polymer | | PC | PC | PC |
| | weight average molecular weight | | 23,500 | 23,500 | 23,500 |
| | amount (parts by weight) | | 30 | 30 | 50 |

TABLE 8-continued

| properties | | | | |
|---|---|---|---|---|
| tensile strength at break | kg/cm² | 760 | 810 | 500 |
| elongation at yield | % | 5 | 4 | >80 |
| flexural strength | kg/cm² | 960 | 1,100 | 760 |
| flexural modulus of elasticity | kg/cm² | 35,700 | 37,500 | 21,900 |
| Izod impact strength (¼ inch in thickness, notched) | kg · cm/cm | 3 | 2 | 8 |
| falling weight impact strength (2 mm in thickness) | kg · cm | 25 | 16 | — |
| deflection temperature under load (18.6 kg/cm²) | °C. | 121 | 122 | 116 |
| melt flow index (250° C./10 kg) | g/10 min | 18 | 17 | 12 |
| peeling resistance | visual observation | Δ | Δ | Δ |
| sea phase-constituting component | observation by electron microscopy | MSMAA | MSMAA imidized with ammonia | PC |

| | | Comparative Example 29 | Comparative Example 30 | Comparative Example 31 |
|---|---|---|---|---|
| formulation | | | | |
| component (A) | type of copolymer | MSMAA | MSMAA imidized with ammonia | MSMAA |
| | proportions of units (% by weight) MMA/St/α-MeSt/MAA/HA/HI (b) (c) (c) (d) (a) (a) | 53/25/20/0.5/1.5/0 | 30/33/5/9/0/23 | 30/33/20/7/10/0 |
| | reduced viscosity (dl/g) | 0.50 | 0.30 | 0.50 |
| | amount (parts by weight) | 32 | 60 | 25 |
| component (B) | type of graft copolymer rubber | MBS A | MBS A | MBS B |
| | number average particle diameter (10⁻⁴ μm) | 2,500 | 2,500 | 500 |
| | amount (parts by weight) | 18 | 15 | 25 |
| component (C) | type of polymer | PC | PC | PC |
| | weight average molecular weight | 23,500 | 23,500 | 23,500 |
| | amount (parts by weight) | 50 | 25 | 50 |
| properties | | | | |
| tensile strength at break | kg/cm² | 530 | 760 | 470 |
| elongation at yield | % | >80 | 4>80 | >80 |
| flexural strength | kg/cm² | 870 | 1,050 | 740 |
| flexural modulus of elasticity | kg/cm² | 22,700 | 24,600 | 22,100 |
| Izod impact strength (¼ inch in thickness, notched) | kg · cm/cm | 21 | 8 | 13 |
| falling weight impact strength (2 mm in thickness) | kg · cm | >1,000 | — | — |
| deflection temperature under load (18.6 kg/cm²) | °C. | 100 | 118 | 121 |
| melt flow index (250° C./10 kg) peeling resistance | g/10 min visual observation | 19 | 12 | 7 |
| sea phase-constituting component | observation by electron microscopy | PC | MSMAA imidized with ammonia | PC |

EXAMPLES 21 AND 22

An MSMAA comprising 60% by weight of methyl methacrylate units, 11% by weight of styrene units, 10% by weight of α-methylstyrene units, 4% by weight of methacrylic acid units and 10% by weight of hexagonal acid anhydride units, MBS A, PC having a weight average molecular weight of 23,500 (Novarex 7025A) and a polycaprolactam having a weight average molecular weight of 5×10⁴ (Leona 2300) were mixed in the weight ratios indicated in Table 9, and melt-kneaded at 300° C. using a twin-screw extruder having a screw diameter of 30 mm (manufactured and sold by Nakatani Kikai K.K., Japan), to thereby obtain test pieces. The properties of the test pieces were determined. The results are shown in Table 9.

TABLE 9

| | | Example 21 | | Example 22 | |
|---|---|---|---|---|---|
| formulation | | | | | |
| component (A) | type of copolymer | MSMAA | | MSMAA | |
| | proportions of units (% by weight) MMA/St/α-MeSt/MAA/HA/HI (b) (c) (c) (d) (a) (a) | 30/33/20/7/10/0 | | 30/33/20/7/10/0 | |
| | reduced visocsity (dl/g) | 0.4 | | 0.4 | |
| | amount (parts by weight) | 20 | | 10 | |
| component (B) | type of graft copolymer rubber | MBS A | | MBS A | |
| | number average particle diameter (10⁻⁴ μm) | 2,500 | | 2,500 | |
| | amount (parts by weight) | 20 | | 20 | |
| component (C) | type of polymer | PC | PA-6 | PC | PA-6 |
| | weight average molecular weight | 23,500 | 5 × 10⁴ | 23,500 | 5 × 10⁴ |
| | amount (parts by weight) | 50 | 10 | 50 | 20 |
| properties | | | | | |
| tensile strength at break | kg/cm² | 460 | | 450 | |
| elongation at yield | % | >80 | | >80 | |
| flexural strength | kg/cm² | 720 | | 720 | |

TABLE 9-continued

|  |  | Example 21 | Example 22 |
|---|---|---|---|
| flexural modulus of elasticity | kg/cm² | 20,300 | 20,900 |
| Izod impact strength (¼ inch in thickness, notched) | kg · cm/cm | 47 | 41 |
| falling weight impact strength (2 mm in thickness) | kg · cm | >1,000 | >1,000 |
| deflection temperature under load (18.6 kg/cm²) | °C. | 118 | 115 |
| melt flow index (250° C./10 kg) | g/10 min | 12 | 10 |
| peeling resistance | visual observation |  |  |
| sea phase-constituting component | observation by electron microscopy | PC | PC |

REFERENCE EXAMPLE 3

Test pieces were prepared in substantially the same manner as in Example 1, except that 75 parts by weight of an MSMAA comprising 33% by weight of methyl methacrylate units, 37% by weight of styrene units, 8% by weight of methacrylic acid units and 22% by weight of hexagonal acid anhydride units, and 25 parts by weight of MBS B were used. The properties of the test pieces were measured. The results are shown in Table 10.

TABLE 10

|  |  | Reference Example 3 |
|---|---|---|
| formulation |  |  |
| component (A) | type of copolymer | MSMAA |
|  | proportions of units (% by weight) |  |
|  | MMA/St/α-MeSt/MAA/HA/HI (b) (c) (c) (d) (a) (a) | 33/37/0/8/22/0 |
|  | reduced viscosity (dl/g) | 0.6 |
|  | amount (parts by weight) | 75 |
| component (B) | type of graft copolymer rubber | MBSA |
|  | number average particle diameter (10⁻⁴ μm) | 500 |
|  | amount (parts by weight) | 25 |
| component (C) | type of polymer | — |
|  | weight average molecular weight | — |
|  | amount (parts by weight) | — |
| properties |  |  |
| tensile strength at break | kg/cm² | 540 |
| elongation at yield | % | 35 |
| flexural strength | kg/cm² | 880 |
| flexural modulus of elasticity | kg/cm² | 26,000 |
| Izod impact strength (¼ inch in thickness, notched) | kg · cm/cm | 4 |
| falling weight impact strength (2 mm in thickness) | kg · cm | — |
| deflection temperature under load (18.6 kg/cm²) | °C. | 102 |
| melt flow index (250° C./10 kg) | g/10 min | 8 |
| peeling resistance | visual observation |  |
| sea phase-constituting component | observation by electron microscopy | MSMAA |

The chemical resistance was evaluated with respect to the test pieces of Example 1 and Reference Example 3.

A test piece (50 mm×50 mm×3.2 mm) was immersed in each of the chemicals listed in Table 11 at room temperature for 7 days. Then, the chemical resistance of the test piece was evaluated in accordance with the following criteria:

E: The test piece was not affected by the chemical.
G: The test piece became slightly hazy and the chemical was slightly colored. The expected life period of the test piece was from several months to several years.
F: The test piece was slightly affected by the chemical. The expected life period of the test piece was from several weeks to several months.
P: The test piece was extremely affected by the chemical. The expected life period of the test piece was several days.
NR: In most cases, the test piece became very soft in several hours.
S: The test piece was dissolved in the chemical. The results are shown in Table 11.

TABLE 11

| Example No. | | Example 1 | Reference Example 3 |
|---|---|---|---|
| Chemicals | formulation (parts by weight) | MSMAA/MBS/PA-6 20/30/50 | MSMAA/MBS 75/25 |
| 10% aqueous acetic acid solution | | G | F |
| 10% aqueous sodium | | G | F |

TABLE 11-continued

| Chemicals | formulation (parts by weight) | Example 1 MSMAA/MBS/PA-6 20/30/50 | Reference Example 3 MSMAA/MBS 75/25 |
|---|---|---|---|
| hydroxide solution |  |  |  |
| ethyl alcohol |  | G | P |
| methyl ethyl ketone |  | F | S |
| gasoline |  | E | NR |

EXAMPLE 23

Test pieces were prepared in substantially the same manner as in Example 1 except that MABS was used instead of the MBS. The properties of the test pieces were measured. The results are shown in Table 12.

EXAMPLE 24

Test pieces were prepared in substantially the same manner as in Example 11 except that MABS was used instead of the MBS. The properties of the test pieces were measured. The results are shown in Table 12.

TABLE 12

|  |  |  | Example 23 | Example 24 |
|---|---|---|---|---|
| formulation |  |  |  |  |
| component (A) | type of copolymer |  | MSMAA | MSMAA |
|  | proportions of units (% by weight) |  |  |  |
|  | MMA/St/α-MeSt/MAA/HA/HI (b) (c) (c) (d) (a) (a) |  | 30/33/20/7/10/0 | 30/33/20/7/10/0 |
|  | reduced viscosity (dl/g) |  | 0.50 | 0.50 |
|  | amount (parts by weight) |  | 20 | 25 |
| component (B) | type of graft copolymer rubber |  | MABS | MABS |
|  | number average particle diameter ($10^{-4}$ μm) |  | 2,200 | 2,200 |
|  | amount (parts by weight) |  | 30 | 25 |
| component (C) | type of polymer |  | PA-6 | PC |
|  | weight average molecular weight |  | $5 \times 10^4$ | 23,500 |
|  | amount (parts by weight) |  | 50 | 50 |
| properties |  |  |  |  |
| tensile strength at break | kg/cm² |  | 540 | 500 |
| elongation at yield | % |  | >80 | >80 |
| flexural strength | kg/cm² |  | 820 | 800 |
| flexural modulus of elasticity | kg/cm² |  | 23,500 | 21,400 |
| Izod impact strength (¼ inch in thickness, notched) | kg·cm/cm |  | 19 | 56 |
| falling weight impact strength (2 mm in thickness) | kg·cm |  | 850 | >1,000 |
| deflection temperature under load (18.6 kg/cm²) | °C. |  | 84 | 122 |
| melt flow index (250° C./10 kg) | g/10 min |  | 4 | 8 |
| moisture absorption (23° C., 24 hr, immersed in water) | % |  | 2.0 | — |
| mold shrinkage (lengthwise direction/crosswise direction) | % |  | 0.86/0.85 | — |
| peeling resistance | visual observation |  |  |  |
| sea phase-constituting component | observation by electron microscopy |  | PA-6 | PC |

EXAMPLE 25

Test pieces were prepared in substantially the same manner as in Example 8, except that an MSMAA comprising 55% by weight of methyl methacrylate units, 12% by weight of methacrylic acid units and 23% by weight of hexagonal acid anhydride units was used as component (A). The properties of the test pieces were measured, and the results are shown in Table 13.

EXAMPLE 26

Test pieces were prepared in substantially the same manner as in Example 11, except that an MSMAA comprising 55% by weight of methyl methacrylate units, 12% by weight of methacrylic acid units and 23% by weight of hexagonal acid anhydride units was used as component (A), and that MBS C was used as component (B). The properties of the test pieces were measured, and the results are shown in Table 13.

TABLE 13

|  |  |  | Example 25 | Example 26 |
|---|---|---|---|---|
| formulation |  |  |  |  |
| component (A) | type of copolymer |  | MSMAA | MSMAA |
|  | proportions of units (% by weight) |  |  |  |
|  | MMA/St/α-MeSt/MAA/HA/HI (b) (c) (c) (d) (a) (a) |  | 55/0/0/12/23/0 | 55/0/0/12/23/0 |
|  | reduced viscosity (dl/g) |  | 0.50 | 0.50 |

TABLE 13-continued

|  |  |  | Example 25 | Example 26 |
|---|---|---|---|---|
|  | amount (parts by weight) |  | 20 | 25 |
| component (B) | type of graft copolymer rubber |  | MBS C | MBS C |
|  | number average particle diameter ($10^{-4}$ μm) |  | 3,300 | 3,300 |
|  | amount (parts by weight) |  | 30 | 25 |
| component (C) | type of polymer |  | PA-6 | PC |
|  | weight average molecular weight |  | $5 \times 10^4$ | 23,500 |
|  | amount (parts by weight) |  | 50 | 50 |
| properties |  |  |  |  |
| tensile strength at break |  | kg/cm$^2$ | 510 | 490 |
| elongation at yield |  | % | >80 | >80 |
| flexural strength |  | kg/cm$^2$ | 800 | 760 |
| flexural modulus of elasticity |  | kg/cm$^2$ | 23,500 | 22,000 |
| Izod impact strength (¼ inch in thickness, notched) |  | kg · cm/cm | 22 | 65 |
| falling weight impact strength (2 mm in thickness) |  | kg · cm | >1,000 | >1,000 |
| deflection temperature under load (18.6 kg/cm$^2$) |  | °C. | 84 | 124 |
| melt flow index (250° C./10 kg) |  | g/10 min | 4 | 8 |
| moisture absorption (23° C., 24 hr, immersed in water) |  | % | 2.4 | — |
| mold shrinkage (lengthwise direction/crosswise direction) |  | % | 1.03/0.98 | — |
| peeling resistance |  | visual observation |  |  |
| sea phase-constituting component |  | observation by electron microscopy | PA-6 | PC |

What is claimed is:

1. A resin composition comprising:
   (A) a copolymer comprising
      (a) 5 to 74.5% by weight of hexagonal units selected from the group consisting of hexagonal acid anhydride units of the formula:

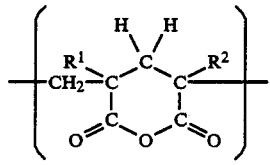

(I)

wherein each of $R^1$ and $R^2$ independently represents a hydrogen atom or a methyl group,
hexagonal imide units of the formula:

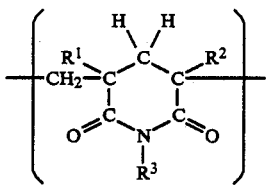

(II)

wherein $R^1$ and $R^2$ are as defined above, and $R^3$ is a member selected from the group consisting of a hydrogen atom, an alkyl group, a cycloalkyl group and an aryl group,
and mixtures thereof;
      (b) 20 to 89.5% by weight of methyl methacrylate units;
      (c) 0 to 69.5% by weight of aromatic vinyl compound units; and
      (d) 0.5 to 20% by weight of methacrylic acid units or acrylic acid units,
with the proviso that the sum of components (a), (b), (c) and (d) is 100% by weight,
   (B) a graft copolymer rubber comprising an elastomer having a glass transition temperature of up to −30° C. and a graft component grafted thereto, said graft component comprising aromatic vinyl compound units and methacrylic ester units, the weight proportion of said graft component relative to said elastomer being at least 20%, and
   (C) at least one polymer selected from the group consisting of a polyamide and a polycarbonate,
   the weight proportion of the copolymer (A) relative to the total weight of components (A), (B) and (C) being 5 to the weight proportion of the graft copolymer rubber (B) relative to the total weight of components (A), (B) and (C) being 5 to 50%, and the weight proportion of the polymer (C) relative to the total weight of components (A), (B) and (C) being 45 to 80%.

2. The resin composition according to claim 1, wherein said hexagonal units (a) are hexagonal acid anhydride units (I).

3. The resin composition according to claim 1, wherein said graft component of the graft copolymer rubber (B) further comprises acrylonitrile units.

4. The resin composition according to claim 1, wherein the weight proportion of the graft component to the elastomer in the graft copolymer rubber (B) is in the range of from 20 to 120%.

5. The resin composition according to claim 1, wherein said methacrylic ester of the graft component is methyl methacrylate.

6. The resin composition according to claim 1, wherein said hexagonal units (a) are a mixture of the hexagonal acid anhydride units (I) and the hexagonal imide units (II) in a weight ratio of from 1/10 to 10/1.

7. The resin composition according to claim 1, wherein said aromatic vinyl compound units (c) are units derived from at least one aromatic vinyl compound selected from the group consisting of styrene, α-methylstyrene, p-methylstyrene, 2,4-dimethylstyrene and p-tert-butylstyrene.

8. The resin composition according to claim 1, wherein the weight proportion of the aromatic vinyl compound units (c) relative to the total weight of components (a), (b), (c) and (d) is in the range of from 5 to 60%.

9. The resin composition according to claim 1, wherein the weight ratio of the copolymer (A) to the graft copolymer rubber (B) is in the range of from 0.3/1 to 2/1, and the graft copolymer rubber (B) is dispersed in the resin composition in the form of particles having a number average diameter of from 0.1 to 1.0 μm.

10. The resin composition according to claim 1, wherein $R^3$ in formula (II) is selected from the group consisting of a hydrogen atom, an alkyl group having 1 to 10 carbon atoms, a cycloalkyl group having 5 to 12 carbon atoms and an aryl group having 7 to 22 carbon atoms.

11. The resin composition according to claim 1, wherein $R^3$ in formula (II) is a hydrogen atom or a phenyl 12. The resin composition according to claim 1, wherein said polyamide (C) comprises units represented by at least one member selected from the group consisting of units of the formula:

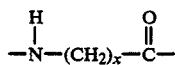  (III)

and units of the formula:

  (IV)

wherein each of x, y and z is independently an integer of from 1 to 10.

13. The resin composition according to claim 12, wherein said polyamide (C) is at least one member selected from the group consisting of polycaprolactam, polyhexamethylene adipamide and polyhexamethylene sebacamide.

14. The resin composition according to claim 1, wherein said polycarbonate (C) comprises units represented by at least one member selected from the group consisting of units of the formula:

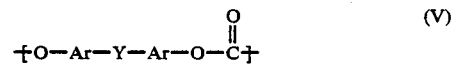  (V)

and units of the formula:

  (VI)

wherein Ar represents an unsubstituted phenylene group or a phenylene group substituted with a halogen atom, an alkyl group having 1 to 6 carbon atoms, a substituted alkyl group having 1 to 6 carbon atoms, an alkoxy group having 1 to 4 carbon atoms or a nitro group, and Y represents an alkylene group having 1 to carbon atoms, an alkylidene group having 2 to 12 carbon atoms, a cycloalkylene group having 6 to 12 carbon atoms, a cycloalkylidene group having 6 to 12 carbon atoms, an ether group, a thioether group, a sulfoxide group or a sulfonyl group.

15. The resin composition according to claim 14, wherein the polycarbonate (C) is poly-4,4'-dioxydiphenyl-2,2'-propane-carbonate.

* * * * *